United States Patent
Matsumoto

(10) Patent No.: US 11,954,365 B2
(45) Date of Patent: Apr. 9, 2024

(54) INFORMATION PROCESSING APPARATUS THAT CONTROLS MEMORY SYSTEM, METHOD OF CONTROLLING SAME, AND STORAGE MEDIUM

(71) Applicant: CANON KABUSHIKI KAISHA, Tokyo (JP)

(72) Inventor: Akihiro Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 17/711,985

(22) Filed: Apr. 1, 2022

(65) Prior Publication Data

US 2022/0326888 A1 Oct. 13, 2022

(30) Foreign Application Priority Data

Apr. 5, 2021 (JP) ................. 2021-064233

(51) Int. Cl.
G06F 12/00 (2006.01)
G06F 3/06 (2006.01)

(52) U.S. Cl.
CPC .......... G06F 3/0659 (2013.01); G06F 3/0604 (2013.01); G06F 3/0619 (2013.01); G06F 3/0683 (2013.01)

(58) Field of Classification Search
CPC ...... G06F 3/0604; G06F 3/061; G06F 3/0619; G06F 3/0659; G06F 3/0679; G06F 3/0683
See application file for complete search history.

(56) References Cited

U.S. PATENT DOCUMENTS

2021/0191632 A1* 6/2021 Lee ................. G06F 1/3268

FOREIGN PATENT DOCUMENTS

JP 2020060869 A 4/2020

* cited by examiner

*Primary Examiner* — Yong J Choe
(74) *Attorney, Agent, or Firm* — Canon U.S.A., Inc. IP Division

(57) ABSTRACT

An information processing apparatus that functions as a SUB controller that, for a command group formed of pairs each formed by a command prepared by a host controller and a status, executes processing of each command and returns a status of an execution result of the command processing. In response to a request for processing the command group from the host controller, the SUB controller acquires the command group therefrom as an original command sequence. The original command sequence is divided into a plurality of segments each formed by one or more commands and having a total volume not larger than a threshold. Command groups each formed of pairs each formed by a command and a status are independently set in one or more storage devices connected to the information processing apparatus. Each storage device is notified of a command processing request on a segment-by-segment basis.

17 Claims, 17 Drawing Sheets

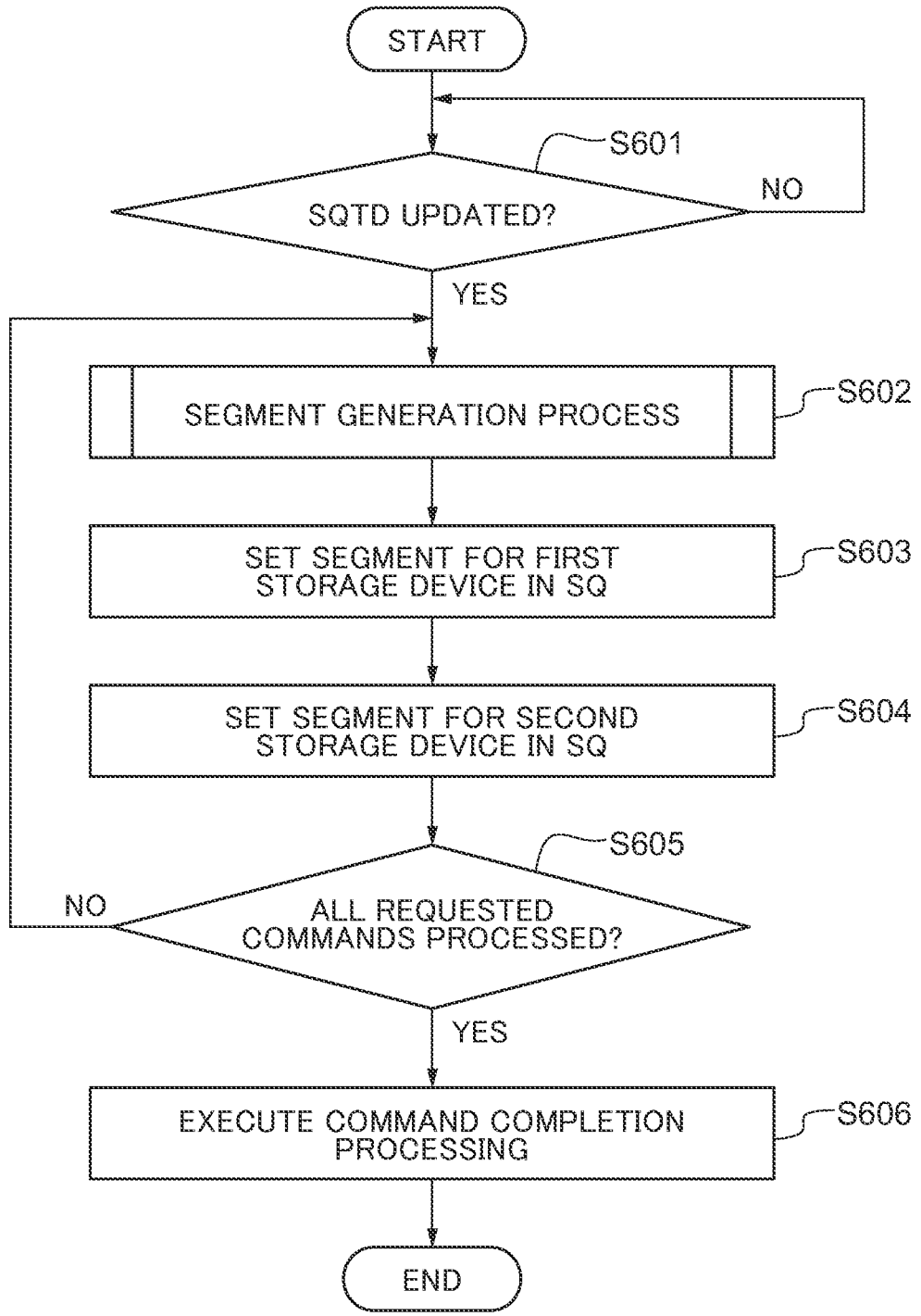

*FIG. 8*

| _____ 800 |
|---|

| EXPANDED COMMANDS ||
|---|---|
| COMMAND ID | NAME |
| 01 | SETUP_SUBCON |
| 02 | SETUP_MIRRORING |
| 03 | GET_STATUS |
| ⋮ | ⋮ |

801, 802, 803

INFORMATION PROCESSING APPARATUS THAT CONTROLS MEMORY SYSTEM, METHOD OF CONTROLLING SAME, AND STORAGE MEDIUM

BACKGROUND OF THE DISCLOSURE

Field of the Disclosure

The disclosure relates to an information processing apparatus, a method of controlling the same, and a storage medium, and more particularly to an information processing apparatus that controls a memory system, a method of controlling the same, and a storage medium.

Description of the Related Art

In recent years, in information processing apparatuses, such as a PC, the storage device is shifted from a hard disk drive (HDD) to a solid state drive (SSD) to realize higher speed data transfer. Among the SSDs, attention is particularly paid to an SSD that can be directly connected to a PCI-Express (PCIe) bus which is a general-purpose bus and is adapted to a non-volatile memory express (NVMe) protocol which is a new protocol that makes use of the high speed of the SSD.

Further, the mechanism for protecting data from a defect of a storage medium, such as an HDD or SSD, includes a mirroring technique for storing data by duplicating the data using two storage devices. The mirroring simultaneously records data received from a host in two storage devices, and hence even when the data or one storage device itself is broken, the data can be restored by copying the data from the other storage device.

Japanese Laid-Open Patent Publication (Kokai) No. 2020-60869 discloses an information processing apparatus that, in a case where an error has occurred in one of two storage devices connected to a bridge device, continues processing using a normal one of the storage devices in which the error has not occurred and performs processing for recovering data from the normal storage device to the storage device in which the error has occurred.

However, in a case where it is difficult to secure sufficient resources in the bridge device in Japanese Laid-Open Patent Publication (Kokai) No. 2020-60869, for example, in a case where a memory size which can be used as a buffer is small, the overhead of data transfer between the two storage devices increases to reduce the processing efficiency. Particularly, if a plurality of commands are simultaneously handled as in non-volatile memory express (NVMe) or the transfer size of one command is large, there arises an issue that efficient error handling cannot be performed.

SUMMARY OF THE DISCLOSURE

In a first aspect of the embodiments, there is provided an information processing apparatus that functions as a SUB controller configured to, for a command group formed of pairs each formed by a command prepared by a host controller and a status, execute command processing of each command and return a status of an execution result of the command processing, including at least one processor, and a memory coupled to the at least one processor, the memory having instructions that, when executed by the processor, perform the operations as: an acquisition unit configured to acquire, in response to receipt of a request for processing the command group from the host controller, the command group from the host controller as an original command sequence, a segmentation unit configured to divide the original command sequence into a plurality of segments each formed by one or more commands and having a total volume not larger than a threshold value, a setting unit configured to independently set respective command groups each formed of pairs each formed by a command and a status, in one or more storage devices connected to the information processing apparatus, and a notification unit configured to notify each of the one or more storage devices of a command processing request on a segment-by-segment basis.

In a second aspect of the embodiments, there is provided a method of controlling an information processing apparatus that functions as a SUB controller configured to, for a command group formed of pairs each formed by a command prepared by a host controller and a status, execute command processing of each command and return a status of an execution result of the command processing, including acquiring, in response to receipt of a request for processing the command group from the host controller, the command group from the host controller as an original command sequence, dividing the original command sequence into a plurality of segments each formed by one or more commands and having a total volume not larger than a threshold value, independently setting respective command groups each formed of pairs each formed by a command and a status, in one or more storage devices connected to the information processing apparatus, and notifying each of the one or more storage devices of a command processing request on a segment-by-segment basis.

Further features of the disclosure will become apparent from the following description of exemplary embodiments (with reference to the attached drawings).

BRIEF DESCRIPTION OF THE DRAWINGS

FIG. 6 is a flowchart of an NVMe command execution process performed by the sub controller.

FIG. 8 is a diagram showing an example of expanded commands exchanged between the host controller and the sub controller.

DESCRIPTION OF THE EMBODIMENTS

The disclosure will now be described in detail below with reference to the accompanying drawings showing embodiments thereof. However, components in the following embodiment are described only by way of example, and are by no means intended to limit the scope of the disclosure. Further, although a mirroring system equipped with two storage devices is used in the embodiment by way of a typical example of the disclosure, the disclosure can be applied to a case where the system is equipped with one storage device, or three or more storage devices. Further, it is needless to say that the mirroring system is not limited to the configuration described in the present embodiment.

Figure 1:
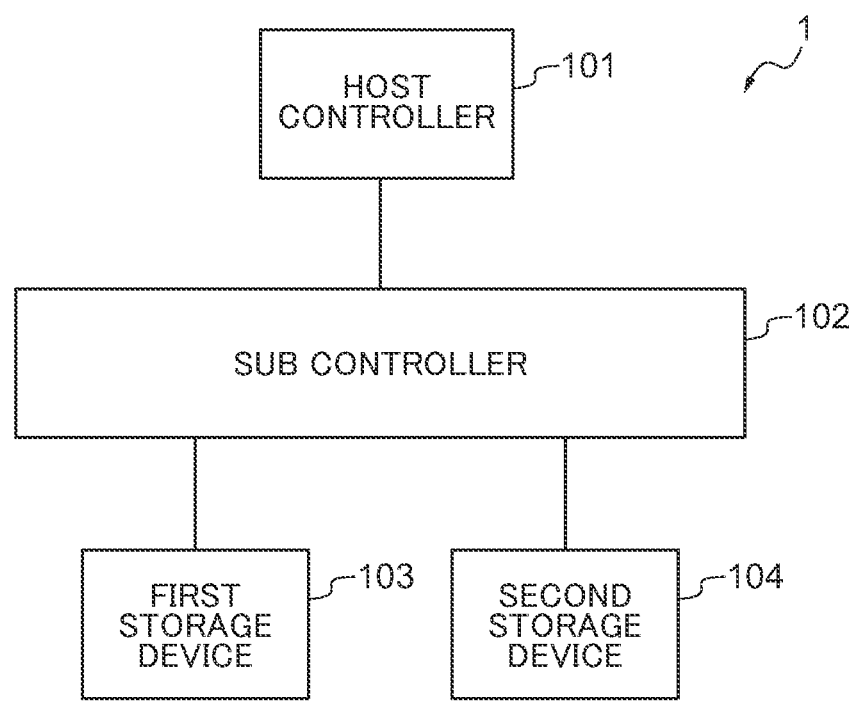
FIG. 1 is a block diagram showing the configuration of a mirroring system including a sub controller as an information processing apparatus according to the disclosure.

FIG. 1 is a block diagram showing the configuration of the mirroring system, denoted by reference numeral 1, which includes a sub controller 102 (hereinafter referred to as the SUB 102) as an information processing apparatus according to the disclosure.

The mirroring system 1 includes a host controller 101 (hereinafter referred to as the HOST 101), the SUB 102, a first storage device 103, and a second storage device 104.

The HOST 101 is connected to the SUB 102 and has functions of a personal computer.

The SUB 102 is connected to the HOST 101, the first storage device 103, and the second storage device 104, and has a mirroring function for duplicating data to be stored from the HOST 101 into the first storage device 103 and storing the duplicated data in the second storage device 104. Note that the mirroring system 1 is only required to have a configuration in which one of the first storage device 103 and the second storage device 104 is set as the master side (master SSD) and the other is set as the slave side (slave SSD).

The first storage device 103 is an SSD that is connected to the SUB 102 and stores system software, user data, application data, and so forth used by the HOST 101.

The second storage device 104 is an SSD that is connected to the SUB 102 and stores backup data generated by duplicating data stored in the first storage device 103.

Figure 2:
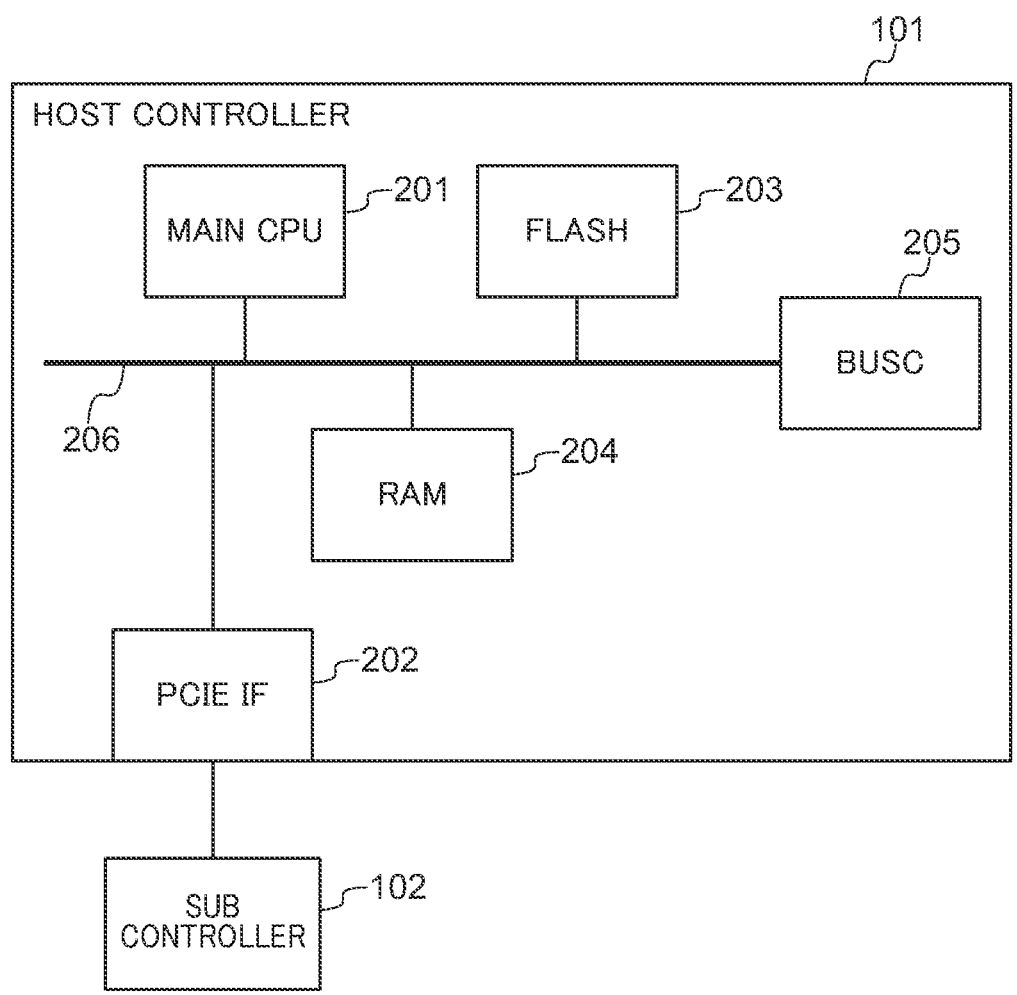
FIG. 2 is a detailed block diagram of a host controller appearing in FIG. 1.

FIG. 2 is a detailed block diagram of the HOST 101.

The HOST 101 includes a main CPU 201, a PCIe interface 202, a flash memory (registered trademark) 203, a RAM 204, and a bus controller (BUSC) 205, and these blocks are connected via an internal bus 206. Further, the HOST 101 is connected to the SUB 102 via the PCIe interface 202.

The main CPU 201 controls, based on control programs and the like stored in the flash memory 203, the access to and from a variety of devices connected thereto and also controls a variety of processes executed by the HOST 101.

The PCIe interface 202 (acquisition unit and access unit) functions as a bus bridge between a PCI-Express standard-based interface as a non-volatile memory express (NVMe) and the internal bus 206. That is, the PCIe interface 202 performs data transmission and reception to and from the internal bus 310, and data transmission and reception to and from the SUB 102 as an endpoint.

The flash memory 203 is a nonvolatile memory including a memory controller and stores a boot program, control programs, and forth, for the HOST 101.

Figure 5A:
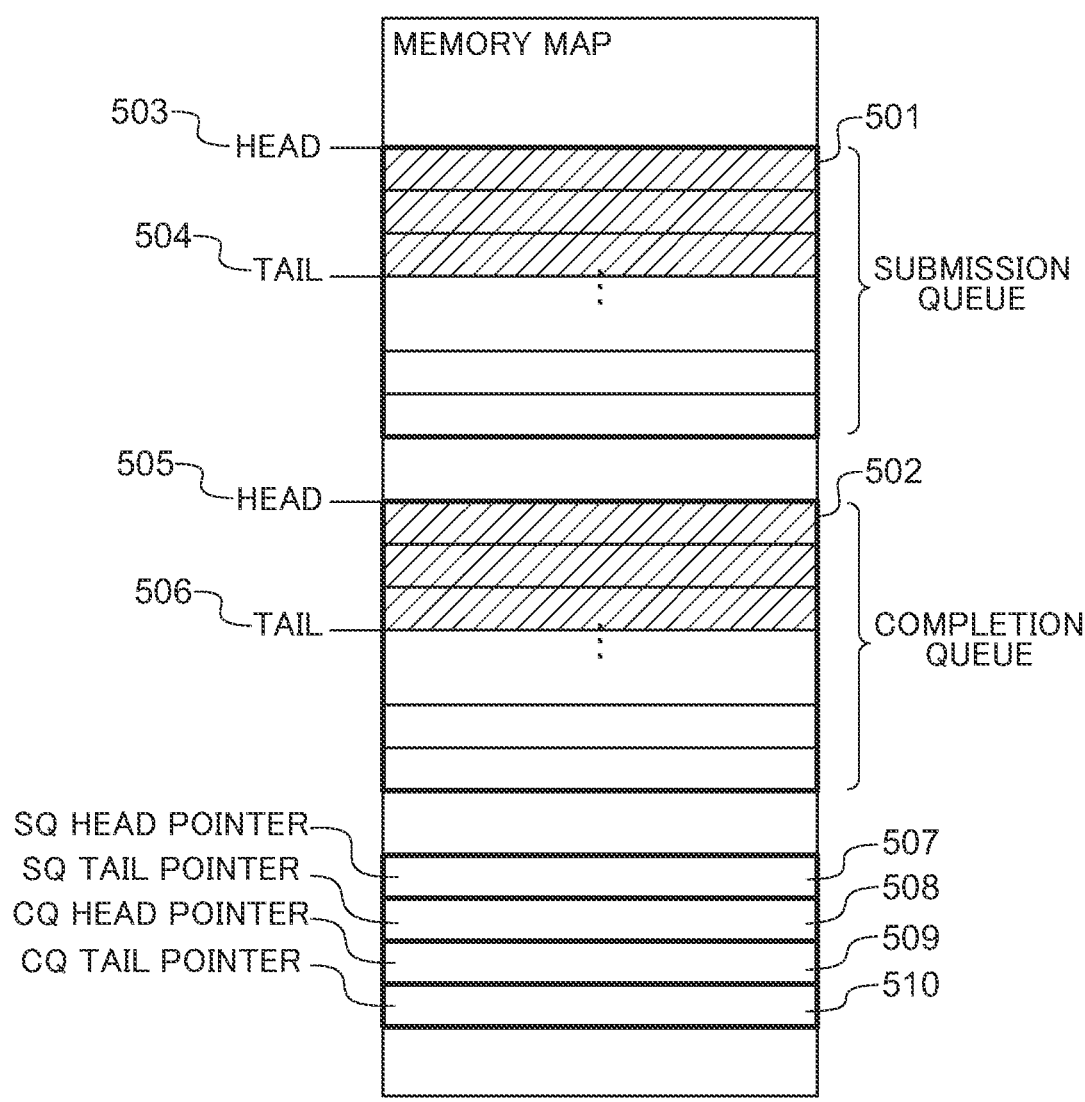
FIG. 5A is a schematic diagram of a memory map of the host controller.

The RAM 204 is a volatile memory section, such as a DRAM, including a memory controller used for temporarily storing data, and functions as a work memory, i.e. a memory space within the HOST 101. FIG. 5A shows an example of a memory map of the RAM 204.

In the memory map of the RAM 204, a submission queue 501 and a completion queue 502 used by the non-volatile memory express (NVMe) protocol are formed. The submission queue is hereinafter referred to as the SQ, and the completion queue is referred to as the CQ.

Referring to FIG. 5A, the SQ 501 is a queue in a ring buffer formed in the RAM 204, in which NVMe commands included in a command sequence generated by the main CPU 201 are sequentially stored so as to request the SUB 102, which is the endpoint, to execute processing of the NVMe commands. Position information of a command 503 at the head of the SQ 501 with respect to the command sequence generated by the main CPU 201 is managed by an SQ head pointer 507. Position information of a command 504 at the tail of the SQ 501 with respect to the command sequence generated by the main CPU 201 is managed by an SQ tail pointer 508. The format of the command will be described hereinafter.

The CQ 502 is a queue in the ring buffer formed in the RAM 204, in which command processing completion notifications received from the SUB 102, which is the endpoint, are sequentially stored. Position information of a command forming a pair with a command processing completion notification 505 at the head of the CQ 502 with respect to the command sequence generated by the main CPU 201 is managed by a CQ head pointer 509. Position information of a command forming a pair with a command processing completion notification 506 at the tail of the CQ 502 with respect to the command sequence generated by the main CPU 201 is managed by a CQ tail pointer 510.

The SQ 501 stores the commands managed by the SQ head pointer 507 and the SQ tail pointer 508 in a hatched area appearing in FIG. 5A. Further, the CQ 502 stores the command processing completion notifications managed by the CQ head pointer 509 and the CQ tail pointer 510 in a hatched area appearing in FIG. 5A. For example, in a case where the SQ head pointer 507 and the SQ tail pointer 508 manage the same position information, the SQ 501 is empty.

Note that it is assumed that the memory spaces allocated to the SQ 501 and the CQ 502 have been statically fixed. The main CPU 201 allocates the memory spaces to the SQ 501 and the CQ 502 when the system is started up, and shares the information on each memory space with the SUB 102 which is the bridge device, using an admin command. However, this is not limitative.

Referring again to FIG. 2, the BUSC 205 (access unit) is a bus controller that performs arbitration of bus requests from the blocks of the HOST 101. Further, the BUSC 205 controls data transmission and reception to and from each of the storage devices (the first storage device 103 and the second storage device 104) using a built-in direct memory access (DMA) function without using the main CPU 201.

Figure 3:
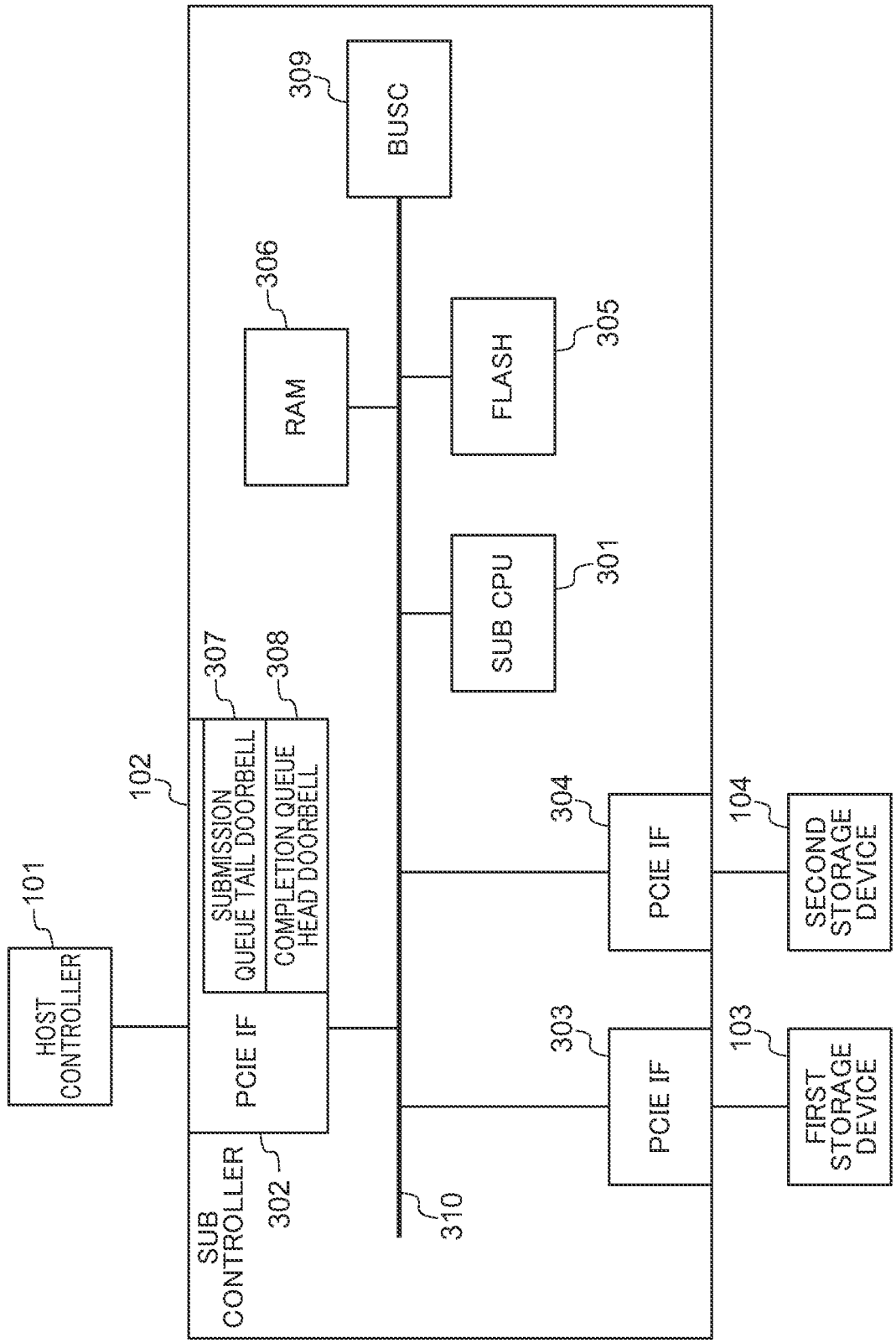
FIG. 3 is a detailed block diagram of the sub controller.

FIG. 3 is a detailed block diagram of the SUB 102.

The SUB 102 includes a sub CPU 301, PCIe interfaces 302 to 304, a flash memory 305, a RAM 306, and a BUSC 309, and these blocks are connected via an internal bus 310. Further, the SUB 102 is connected to the HOST 101, the first storage device 103, and the second storage device 104 via the PCIe interfaces 302 to 304, respectively.

The sub CPU 301 controls, based on control programs and the like stored in the flash memory 305, the access to and from the HOST 101, the first storage device 103, and the second storage device 104. Further, the sub CPU 301 generates command groups for the first storage device 103 and the second storage device 104, respectively, based on a command group received from the HOST 101.

The PCIe interface 302 (acquisition unit and access unit) functions as a bus bridge between a PCI-Express standard-based interface as the NVMe and the internal bus 310. That is, the PCIe interface 302 performs data transmission and reception to and from the internal bus 310, and data transmission and reception to and from the HOST 101 by using the HOST 101 as the Root Complex. The PCIe interface 302 includes registers of a submission queue tail doorbell (hereinafter referred to as the SQTD) 307 and a completion queue head doorbell (hereinafter referred to as the CQHD) 308 therein. These registers are for storing information on the SQ tail pointer 508 for the SQ 501 in the HOST 101 and information on the CQ head pointer 509 for the CQ 502 in the same, respectively.

The PCIe interfaces 303 and 304 each function as a bus bridge between a PCI-Express standard-based interface as the NVMe and the internal bus 310. That is, the PCIe interface 303 performs data transmission and reception to and from the internal bus 310, and data transmission and reception to and from the first storage device 103 by using the first storage device 103 as the endpoint. Similarly, the PCIe interface 304 performs data transmission and reception to and from the internal bus 310, and data transmission and reception to and from the second storage device 104 by using the second storage device 104 as the endpoint.

The flash memory 305 is a nonvolatile memory including a memory controller and stores a boot program, control programs, and so forth, for the SUB 102.

Figure 5B:
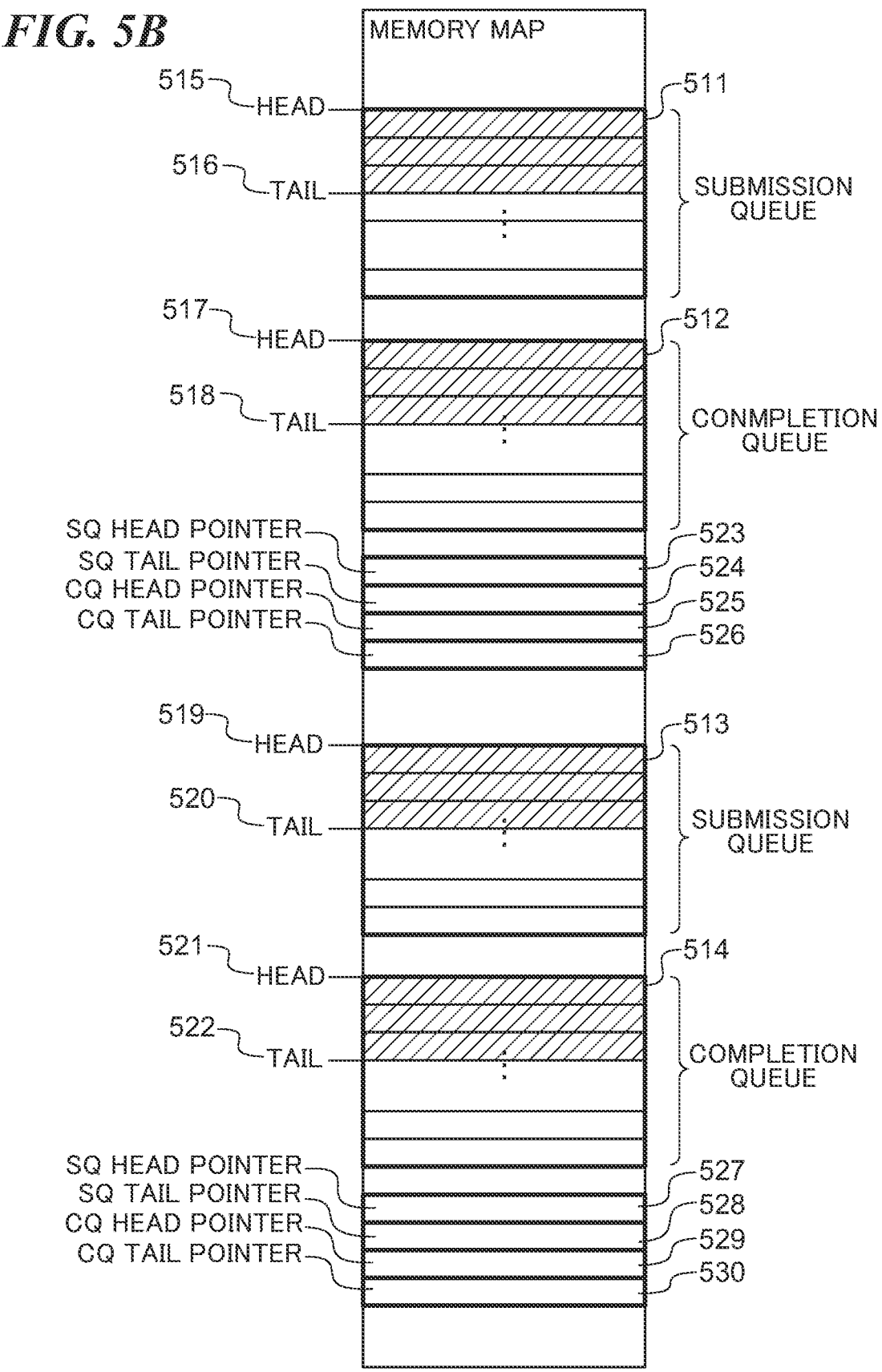
FIG. 5B is a schematic diagram of a memory map of the sub controller.

The RAM 306 is a volatile memory including a memory controller, such as a DRAM, for temporarily storing data, and functions as a work memory, i.e. a memory space within the SUB 102. FIG. 5B shows an example of a memory map of the RAM 306.

In the memory map of the RAM 306, two sets each consisting of a SQ and a CQ, which are used by the NVMe protocol, are formed (a SQ 511, a SQ 513, a CQ 512, and a CQ 514). The SQ 511 and the CQ 512 are used for NVMe transfer to the first storage device 103. The SQ 513 and the CQ 514 are used for NVMe transfer to the second storage device 104. More specifically, a command and a status forming a pair with this command are independently set in the SQ 511 and the CQ 512, respectively, and a command and a status forming a pair with this command are independently set in the SQ 513 and the CQ 514, respectively.

The SQ 511 is a queue in a ring buffer formed in the RAM 306 to perform processing of NVMe commands, which is requested from the HOST 101, in the first storage device 103, which is the endpoint. In the SQ 511, commands are sequentially stored based on the command contents (original command sequence) in the SQ 501 on a segment-by-segment basis, as will be described hereinafter. More specifically, position information of a command at the head of the segments stored in the SQ 511 with respect to the original command sequence is managed by an SQ head pointer 523 (holding unit), and position information of a command at the tail of the same with respect to the original command sequence is managed by an SQ tail pointer 524 (holding unit).

The CQ 512 is a queue in a ring buffer formed in the RAM 306, in which command processing completion notifications received from the first storage device 103, which is the endpoint, are sequentially stored. Position information of a command forming a pair with a command processing completion notification 517 at the head of the CQ 512 with respect to the original command sequence is managed by a CQ head pointer 525, and position information of a command processing completion notification 518 at the tail of the CQ 512 with respect to the original command sequence is managed by a CQ tail pointer 526.

The SQ 513 is a queue in a ring buffer formed in the RAM 306 to perform processing of NVMe commands, which is requested from the HOST 101, in the second storage device 104, which is the endpoint. In the SQ 513, commands are sequentially stored by the sub CPU 301 based on the command contents (original command sequence) in the SQ 501 on a segment-by-segment basis, as will be described hereinafter. More specifically, position information of a command at the head of the segments stored in the SQ 513 with respect to the original command sequence is managed by an SQ head pointer 527 (holding unit), and position information of a command at the tail of the same with respect to the original command sequence is managed by an SQ tail pointer 528 (holding unit).

The CQ 514 is a queue in a ring buffer formed in the RAM 306, in which command processing completion notifications received from the second storage device 104, which is the endpoint, are sequentially stored. Position information of a command forming a pair with a command processing completion notification 521 at the head of the queue of the CQ 514 with respect to the original command sequence is managed by a CQ head pointer 529. Further, position information of a command forming a pair with a command processing completion notification 522 at the tail of the queue of the CQ 514 with respect to the original command sequence is managed by a CQ tail pointer 530.

The illustrated example in FIG. 5B indicates that the commands or the command processing completion notifications are stored in the hatched areas of the SQ 511, the SQ 513, the CQ 512, and the CQ 514.

Note that it is assumed that the memory spaces allocated to the SQ 511, the SQ 513, the CQ 512, and the CQ 514 have been statically fixed. The sub CPU 301 allocates the memory spaces to the SQ 511, the SQ 513, the CQ 512, and the CQ 514 when the system is started up, and shares the information on each memory space with the first storage device 103 and the second storage device 104 using an admin command. However, this is not limiting.

Referring again to FIG. 3, the BUSC 309 is a bus controller that performs arbitration of bus requests from the blocks of the SUB 102 and controls data transmission and reception to and from the first storage device 103 and the second storage device 104 using a built-in DMA function without using the sub CPU 301. Through collaboration with the BUSCs 205 and 309 (access unit), the first storage device 103 and the second storage device 104 can access the memory spaces within the HOST 101 (more specifically, the RAM 204) and perform writing or readout with respect to a target in the memory space.

Figure 4:
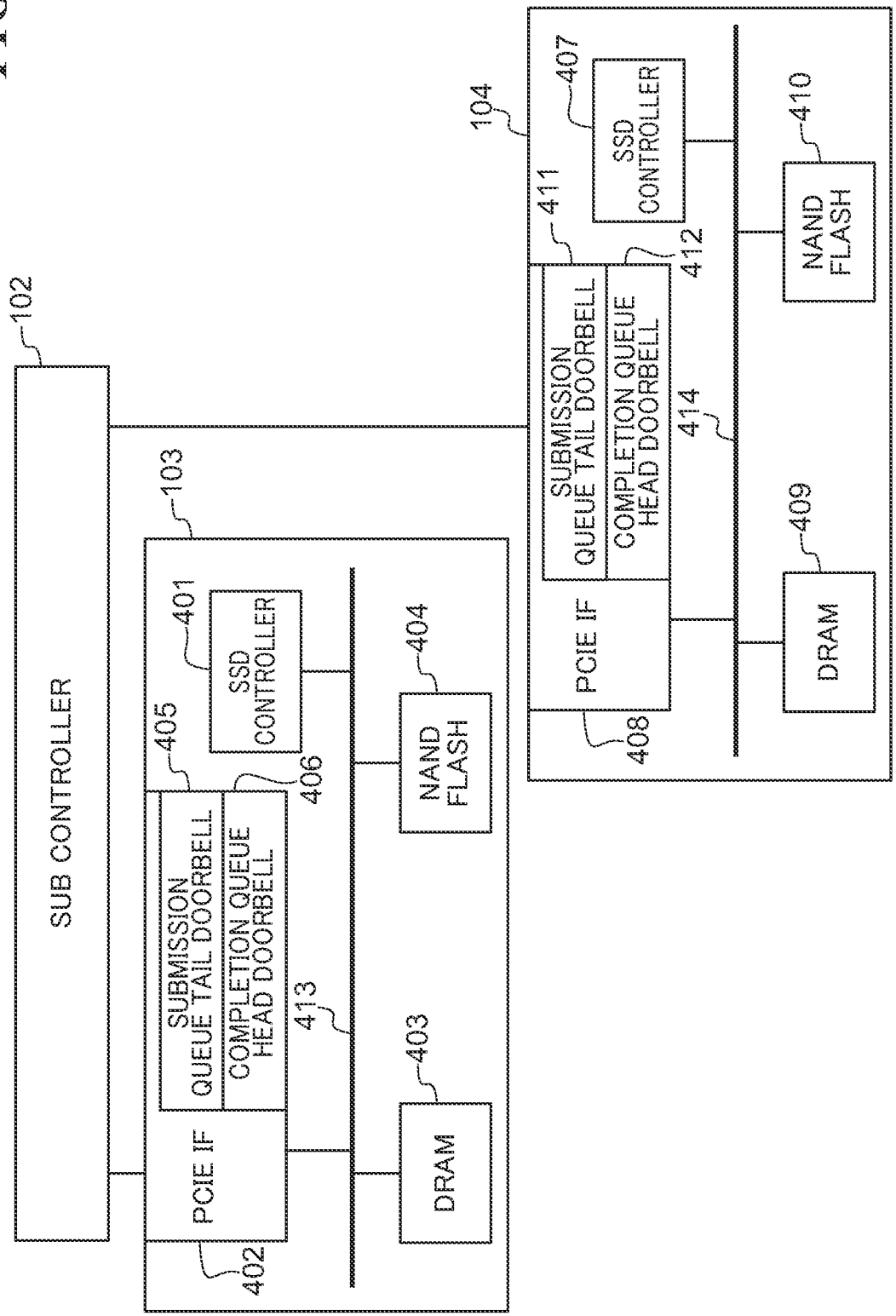
FIG. 4 is a detailed block diagram of a first storage device and a second storage device, appearing in FIG. 1.

FIG. 4 is a detailed block diagram of the first storage device 103 and the second storage device 104.

The first storage device 103 includes an SSD controller 401, a PCIe interface 402, a DRAM 403, and a NAND flash memory 404, and these blocks are connected via an internal bus 413. Further, the first storage device 103 is connected to the SUB 102 via the PCIe interface 402.

The SSD controller 401 is equipped with a processor that processes firmware executed inside the first storage device 103, a DRAM controller that controls the DRAM 403, and a NAND flash memory controller that controls the NAND flash memory 404.

The PCIe interface 402 functions as a bus bridge between a PCI-Express standard-based interface as the NVMe and the internal bus 413. More specifically, the PCIe interface 402 performs data transmission and reception to and from the internal bus 413, and data transmission and reception to and from the SUB 102 by using the SUB 102 as the Root Complex. The PCIe interface 402 has registers of a SQTD 405 and a CQHD 406 therein. These registers are for storing information on the SQ tail pointer 524 for the SQ 511 in the SUB 102 and information on the CQ head pointer 525 for the CQ 512.

The DRAM 403 is a cache memory for temporarily storing data before writing the data into the NAND flash memory 404.

The NAND flash memory 404 is a device for actually recording data, and reads and writes data therein and therefrom.

The second storage device 104 has the same configuration as that of the first storage device 103, and hence description of the second storage device 104 is omitted.

A format 700 of the NVMe command will be described. However, command attached information is conceptual and does not necessarily represent the contents of the NVMe standard.

Figure 7:
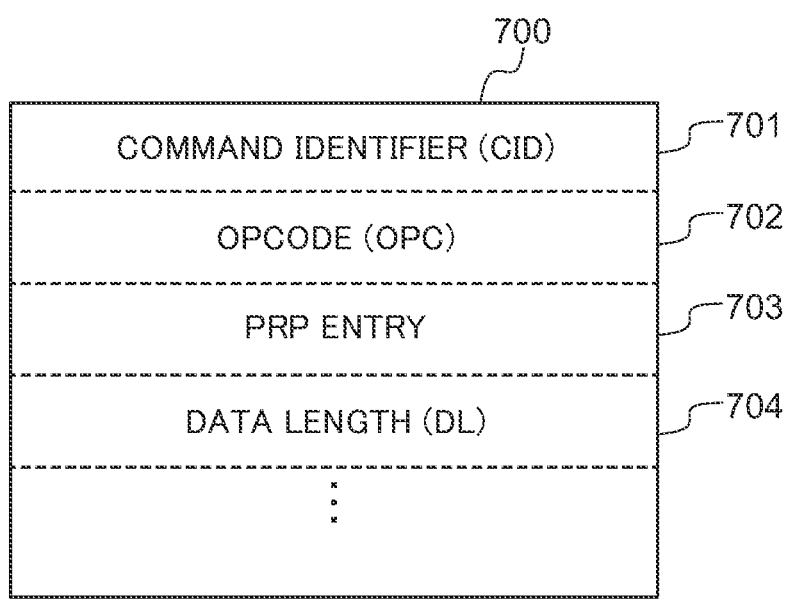
FIG. 7 is a format diagram of the NVMe command.

The format 700 of the NVMe command, shown in FIG. 7, has fields of a CID 701, an OPC 702, a PRP Entry 703, and a DL 704, or information corresponding to these.

The CID 701 is a unique number (Command Identifier) added to a command.

The OPC 702 is an identifier (Opcode) representing a type of a command, such as WRITE or READ.

The PRP Entry 703 stores information indicative of an address of a transfer source or an address of a transfer destination.

The DL 704 stores information indicative of a transfer data size (data length). With this, it is possible to know a transfer amount of one command.

FIG. 8 is a diagram showing an example of expanded commands exchanged between the HOST 101 and the SUB 102, for setting the SUB 102 or acquiring the internal status. More specifically, the expanded commands are unique commands defined by using commands specific to a vendor (vendor specific commands) or the like, defined by the NVMe standard, and FIG. 8 shows command IDs and names.

As shown in FIG. 8, the expanded commands 800 include SETUP_SUBCON 801, SETUP_MIRRORING 802, and GET_STATUS 803.

The SETUP_SUBCON 801 is a command for setting a variety of settings inside the SUB 102.

The SETUP_MIRRORING 802 is a command for setting a variety of settings for causing the SUB 102 to operate in a mirroring mode.

The GET_STATUS 803 is a command for returning the current internal state of the SUB 102.

Note that FIG. 8 shows some types of the expanded commands by way of example, but are by no means intended to particularly limit the details thereof.

The main CPU 201 generates an NVMe command to perform the IO access to the first storage device 103 using the NVMe protocol. That is, the main CPU 201 is not conscious of the SUB 102 which is the bridge device when generating an NVMe command and behaves as if the main CPU 201 directly transmits the NVMe command to the first storage device 103.

When an NVMe command is generated, the main CPU 201 sequentially stores the NVMe command in the SQ 501 (see FIG. 5A) in the RAM 204. The main CPU 201 updates the SQ tail pointer 508 of the SQ 501 whenever an NVMe command is stored, and updates the position information of the NVMe command stored as the command 504 at the tail of the SQ 501. When the SQ tail pointer 508 is updated, the main CPU 201 writes a value of the SQ tail pointer 508 of the SQ 501 in the SQTD 307 of the SUB 102 to notify the SUB 102 that the NVMe command has been newly stored. With this, the sub CPU 301 of the SUB 102 starts an operation for executing the NVMe commands stored in the SQ 501. The operation of the SUB 102 will be described hereinafter.

Upon receipt of a completion interrupt indicating that the SUB 102 has completed execution of all the commands, the main CPU 201 can know whether or not all the commands have been correctly executed by referring to command execution results stored in the CQ 502. With the above-described process, writing/reading of data into and from the first storage device 103 is controlled.

Similarly, also between the SUB 102, and the first storage device 103 and the second storage device 104, the operation for executing the NVMe commands stored in the SQ 501 is started via the SQs 511 and 513, and the SQ tail pointers 524 and 528 of the SQs 511 and 513. In the following description, explanation of the data transfer flow based on the NVMe standard is not repeated. Note that the interrupt between the HOST 101 and the SUB 102, and the interrupt between the SUB 102, and the first storage device 103 and the second storage device 104 are both performed according to MSI (Message Signaled Interrupt) defined by the PCIe. Further, although not shown here, an interrupt performed according to the MSI is notified to each CPU by an interrupt controller in each layer.

The sub CPU 301 acquires a command group (original command sequence) prepared in the HOST 101, and divides the acquired command group into a plurality of segments (sets of commands, described in detail hereinafter). Commands of each segment are set in the first storage device 103 and the second storage device 104, and the command processing is executed.

FIG. 6 is a flowchart of an NVMe command execution process performed by the SUB 102. The present process is executed by the sub CPU 301.

Figure 9A:
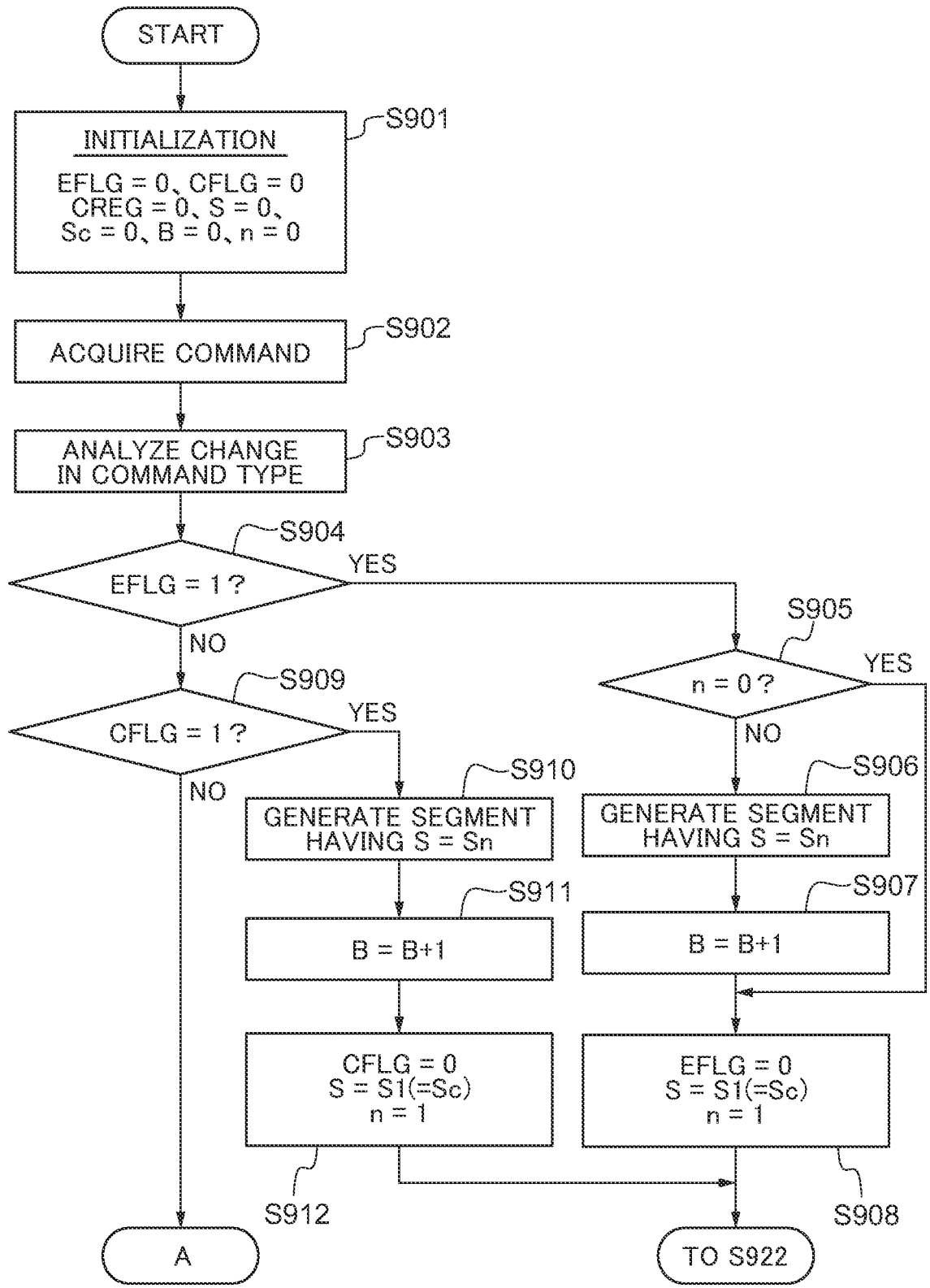
FIG. 9A is a flowchart of a segment generation process executed in a step in the NVMe command execution process in FIG. 6.
Figure 9B:
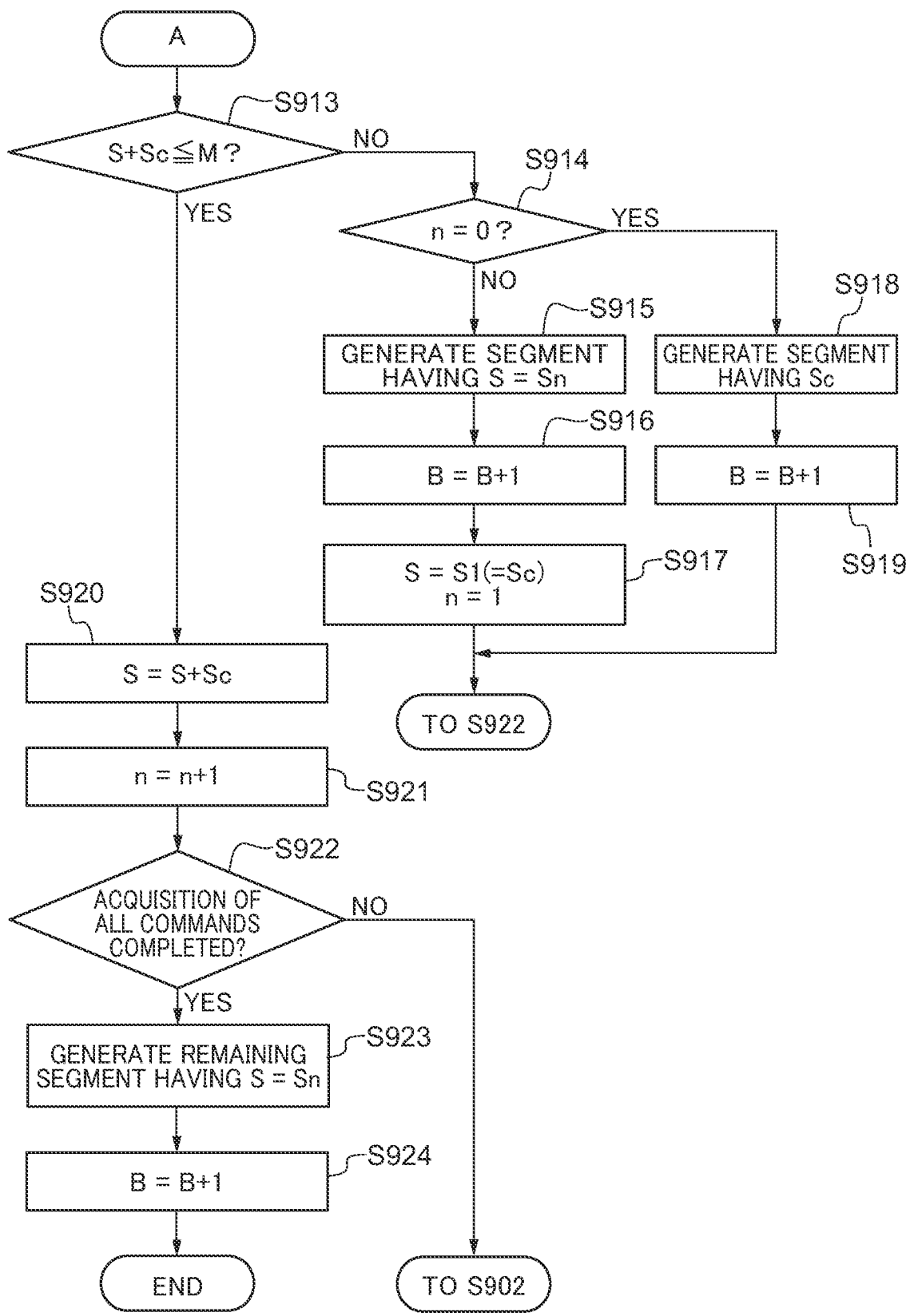
FIG. 9B is a continuation of FIG. 9A.

Note that in the present embodiment, the present process is described as configured such that three threads are executed in parallel. A first thread corresponds to a step S602 in which a segment generation process shown in FIGS. 9A and 9B is executed. Second and third threads correspond to steps S603 and 604, and execute the NVMe command processing described above. However, this is not limitative.

In a step S601, the sub CPU 301 checks whether or not new NVMe commands have been stored in the SQ 501 of the HOST 101 by the update of the value of the SQTD 307. When the value of the SQTD 307 is updated, the update is notified to the sub CPU 301 by an interrupt. If the value of the SQTD 307 has been updated (YES to the step S601), the process proceeds to the step S602, whereas if the value of the SQTD 307 has not been updated (NO to the step S601), the process remains in the step S601.

In the step S602, the sub CPU 301 executes the segment generation process for fetching NVMe commands prepared in the HOST 101 from the SQ 501 and generating segments.

Here, segmentation refers to decomposing (dividing) an original command sequence prepared in the HOST 101 based on conditions set in advance, and a segment refers to one or more divided command sequences shorter than the original command sequence. Further, units of segmentation are referred to as segment units. Hereafter, the terms "segmentation" and "segment" are used in the meanings described above.

An initial value of the SQ head pointer 507 of the SQ 501 has been notified from the HOST 101 at the time of the system startup as described above, and when transfer of a series of NVMe commands is completed, the value of the SQ tail pointer 508 is updated to the value of the SQ head pointer 507. The segment generation process is managed by this mechanism. The segments are generated separately for the first storage device 103 and the second storage device 104, respectively. Details of the segment generation process will be described hereinafter with reference to FIGS. 9A and 9B.

In a step S603, the sub CPU 301 sets the commands of a segment for the first storage device 103, which are generated in the step S602, in the SQ 511, and the respective statuses associated with these commands in the CQ 512. Further, the sub CPU 301 sets values indicating position information of these commands and statuses associated therewith, in the SQ head pointer 523 and the SQ tail pointer 524 for the SQ 511, and the CQ head pointer 525 and the CQ tail pointer 526 for the CQ 512. After that, the sub CPU 301 (notification unit) executes doorbell notification which means the start of the processing by writing the value of the SQ tail pointer 524 into the SQTD 405 of the first storage device 103. With this doorbell notification, fetching of NVMe commands is started mainly by the SSD controller 401 of the first storage device 103. The processing is performed according to the contents of each fetched NVMe command, and the status notification of the command processing result is written into the CQ 512 whenever each command processing is terminated. Then, when the processing operations of all commands (=desired segment processing) to be performed by the first storage device 103 are terminated, a segment processing termination notification is sent to the SUB 102 (termination interruption reception unit) by an interrupt. Upon receipt of the segment processing termination notification (command processing termination interrupt) from the first storage device 103, the SUB 102 (completion notification unit) executes doorbell notification which means processing completion by writing the value of the CQ head pointer 525 into the CQHD 406 of the first storage device 103. The first storage device 103 having received this doorbell notification terminates the present segment processing (hereinafter referred to as the "current segment processing").

In a step S604, the sub CPU 301 sets the commands of a segment for the second storage device 104, which are generated in the step S602, in the SQ 513, and the respective statuses associated with the commands in the CQ 514. Further, the sub CPU 301 sets values indicating position information of these commands and statuses associated therewith in the SQ head pointer 527 and the SQ tail pointer 528 for the SQ 513, and the CQ head pointer 529 and the CQ tail pointer 530 for the CQ 514. After that, the sub CPU 301 (notification unit) executes doorbell notification which means the start of the processing by writing the value of the SQ tail pointer 528 into the SQTD 411 of the second storage device 104. With this doorbell notification, extraction of NVMe commands is started mainly by the SSD controller 407 of the second storage device 104. The processing is performed according to the contents of the extracted NVMe commands, and the status notification of the command processing result is written into the CQ 514 whenever each command processing is terminated. Then, when the processing operations of all commands (=desired segment processing) to be performed by the second storage device 104 are terminated, a segment processing termination notification is sent to the SUB 102 (termination interrupt reception unit) by an interrupt. Upon receipt of the segment processing termination notification from the second storage device 104, the SUB 102 (completion notification unit) executes doorbell notification which means processing completion by writing the value of the CQ head pointer 529 into the CQHD 412 of the second storage device 104. The second storage device 104 having received this doorbell notification terminates the current segment processing.

Here, when the current segment processing is terminated in both of the first storage device 103 and the second storage device 104, the SUB 102 (timing control unit) checks the status information (CQ information) stored at the same positions in both of the devices, respectively. Then, the SUB 102 determines the timing of writing the status into the CQ 502 of the HOST 101 according to the contents of the status information. Details of the behavior of the SUB 102 toward the HOST 101 with respect to each segment processing will be described with reference to FIGS. 12A and 12B.

In a step S605, the sub CPU 301 determines whether or not the processing operations for executing the NVMe commands in all segments generated in the step S602 (=processing operations for the command group requested from the HOST 101) have been completed. If the processing operations for executing the NVMe commands in all segments have not been completed (No to the step S605), the process returns to the step S602 to continue to execute the next segment processing. On the other hand, if the processing operations for executing the NVMe commands in all segments have been completed (YES to the step S605), the process proceeds to a step S606.

In the step S606, the sub CPU 301 executes command completion processing between the SUB 102 and the HOST 101. More specifically, the sub CPU 301 (termination interrupt-issuing unit) notifies the HOST 101 that the processing operations of all of the requested commands have been terminated, by an interrupt (command processing termination interrupt). Further, the HOST 101 executes doorbell notification which means processing completion by writing the value of the CQ head pointer 509 into the CQHD 308 of the SUB 102 (completion reception unit). The SUB 102 having received this doorbell notification terminates all command processing operations, followed by terminating the present process.

The segment generation process in the step S602 will be described with reference to FIGS. 9A and 9B.

Segments generated in the step S602 are hereinafter referred to as an E segment, a W segment, an R segment, an S segment, and an M segment according to types of commands forming a segment, respectively.

The E segment is a segment formed by expanded commands (hereinafter referred to as the E commands) for the HOST 101 and the SUB 102 itself that generates the segment in the step S602.

The W segment is a segment formed only by write commands (hereinafter referred to as the W commands) defined by the NVMe.

The R segment is a segment formed only by read commands (hereinafter referred to as the R commands).

The S segment is a segment formed only by system commands (hereinafter referred to as the S commands). Note that each S command is a command for acquiring settings and internal information of the first storage device 103 and the second storage device 104 each of which is the SSD defined by the NVMe. Typical examples of the S command include an IDENTIFY DEVICE command and a SMART command.

The M segment is a segment formed by a mixture of W, R, and S commands.

Referring to FIG. 9A, in a step S901, the sub CPU 301 performs initialization.

Here, the settings to be initialized will be described.

A flag EFLG has an initial value of 0 and its value is changed from 0 to 1 at a point where a change from an E command to another command occurs and at a point where a change from another command to an E command occurs.

A flag CFLG has an initial value of 0 and its value is changed from 0 to 1 at a point where a change from a R command to a W command occurs.

A variable CREG has an initial value of 0 and records a type of a preceding command (e.g. a value of 1 for W, a value of 2 for R, a value of 3 for S, or a value of 4 for E). The sub CPU 301 controls the flags (EFLG and CFLG) by comparing the variable CREG and the current command type.

A current segment size S has an initial value of 0 and its value indicates the size of the current segment.

A current command size Sc has an initial value of 0 and its value indicates the size of the current command.

A segment number B has an initial value of 0 and its value indicates a position in a segment processing sequence. Note that the processing of each segment is executed without putting the time series of the original command sequence into disorder.

A number-of-commands n is a variable which has an initial value of 0 and its value indicates the number of commands included in a segment.

In a step S902, the sub CPU 301 acquires a command from the SQ 501 prepared in the HOST 101 one by one.

In a step S903, the sub CPU 301 analyzes a change in command type in the flag EFLG and the flag CFLG.

In a step S904, the sub CPU 301 determines whether or not the flag EFLG is equal to 1. If it is determined that the flag EFLG is equal to 1 (YES to the step S904), the process proceeds to a step S905.

In the step S905, the sub CPU 301 determines whether or not the number-of-commands n is equal to 0. If it is determined that the number-of-commands n is equal to 0 (YES to the step S905), the process proceeds to a step S908, whereas if not (NO to the step S905), the process proceeds to a step S906.

In the step S906, the sub CPU 301 generates a segment having the current segment size S set to Sn (segment including n commands), and then the process proceeds to a step S907 wherein the sub CPU 301 increments the segment number B by one. More specifically, in the step S906, at a point where a change from another command to an E command occurs, a segment based on the other command is generated, and at a point where a change from an E command to another command occurs, the E segment is generated.

In the step S908, the sub CPU 301 initializes the flag EFLG to 0, sets the current segment size S to S1, substitutes the value of S1 for the current command size Sc, sets the number-of-commands n to 1, and then the process proceeds to a step S922 (in FIG. 9B).

If it is determined in the step S904 that the flag EFLG is not equal to 1 (NO to the step S904), the process proceeds to a step S909.

In the step S909, the sub CPU 301 determines whether or not the flag CFLG is equal to 1. If it is determined that the flag CFLG is equal to 1 (YES to the step S909), the process proceeds to a step S910.

In the step S910, the sub CPU 301 generates a segment having the current segment size S set to Sn, and the process proceeds to a step S911 wherein the sub CPU 301 increments the segment number B by one. More specifically, in the step S910, in a case where at least R command(s) and W command(s) are mixed in the original command sequence, the sub CPU 301 (division unit) divides the command sequence into segments such that no W command immediately follows an R command in a segment. This is because there is a possibility that in recovery processing executed in a case where an R command from the master SSD has caused an error, a value read from the same address of the slave SSD cannot be guaranteed as recovery data. The same applies to a case where a single mode (configuration in which no slave SSD is connected to the SUB 102) is set. However, this depends also on the mounting specifications of the HOST 101 and the SSDs (the first storage device 103 and the second storage device 104), and hence is not limitative. Next, the process proceeds to a step S912.

In the step S912, the sub CPU 301 initializes the flag CFLG to 0, sets the current segment size S to S1, substitutes the value of S1 for the current command size Sc, sets the number-of-commands n to 1, and then the process proceeds to the step S922 (in FIG. 9B).

If it is determined in the step S909 that the flag CFLG is not equal to 1 (NO to the step S909), the process proceeds to a step S913 (in FIG. 9B).

In the step S913, the sub CPU 301 performs processing for comparing an added-up value of the current segment size S and the current command size Sc with a segment maximum size M (total volume) set in advance. The value of the segment maximum size M (threshold value) can be set in advance by the SETUP_SUBCON 801 which is an expanded command (operation of a segment condition-setting unit). Further, the HOST 101 can dynamically change the value of the segment maximum size M in units of SQ to be requested. If it is determined that the added-up value of the current segment size S and the current command size Sc is larger than the segment maximum size M (NO to the step S913), the process proceeds to a step S914 for the sub CPU 301 (segmentation unit) to generate a segment.

In the step S914, the sub CPU 301 determines whether or not the number-of-commands n is equal to 0. If it is determined that the number-of-commands n is not equal to 0 (NO to the step S914), the process proceeds to a step S915.

In the step S915, the sub CPU 301 generates a segment having the current segment size S set to Sn, and the process proceeds to a step S916 wherein the sub CPU 301 increments the segment number B by one.

In a step S917, the sub CPU 301 sets the current segment size S to S1, substitutes the value of S1 for the current command size Sc, and sets the number-of-commands n to 1, and then the process proceeds to the step S922.

If it is determined in the step S914 that the number-of-commands n is equal to 0 (YES to the step S914), the process proceeds to a step S918.

In the step S918, the sub CPU 301 generates a segment having the current command size Sc, and the process proceeds to a step S919 wherein the sub CPU 301 increments the segment number B by one, and then the process proceeds to the step S922. That is, in a case where the current one command has a size exceeding M which is the specified size, a segment formed by the one command is generated in the step S918.

If it is determined in the step S913 that the added-up value of the current segment size S and the current command size Sc is not larger than the segment maximum size M (not larger than the threshold value) (YES to the step S913), the process proceeds to a step S920.

In the step S920, the sub CPU 301 substitutes the added-up value of the current segment size S and the current command size Sc for the current segment size for S, and increments the number-of-commands n by one in the next step S921, and then the process proceeds to the step S922. In the step S922, the sub CPU 301 determines whether or not the processing has been completed with respect to all commands requested from the HOST 101. If it is determined that the processing has not been completed with respect to all commands (NO to the step S922), the sub CPU 301 returns to the step S902.

Here, by repeating a loop in which the answer to the question of the step S904 becomes affirmative (YES) after execution of the steps S902 and S903, the answer to the question of the step S922 becomes negative (NO) after execution of the steps S905 to S908, and then the answer to the question of the step S904 becomes affirmative (YES) again, the E segment formed by one or more E commands is extracted and generated from the original command sequence.

Further, in the present process, a loop is repeated in which the answer to the question of the step S904 becomes negative (NO) after execution of the steps S902 and S903, the answer to the question of the step S909 becomes affirmative (YES), the answer to the question of the step S922 becomes negative (NO) after execution of the steps S910 to S912, and then the answer to the question of the step S909 becomes affirmative (YES) again. With this, in a segment including an R command, the segment is divided so as to prevent successive W commands from being included in a range from the tail of the segment back to a desired position.

Further, in the present process, a loop is repeated in which the answer to the question of the step S904 becomes negative (NO) after execution of the steps S902 and S903, the answer to the question of the step S909 becomes negative (NO), the answer to the question of the step S913 becomes negative (NO), the answer to the question of the step S914 becomes negative (NO), the answer to the question of the step S922 becomes negative (NO) after execution of the steps S915 to S917, and then the answer to the question of the step S913 becomes negative (NO) again. With this, an R segment, a W segment, an S segment, and an M segment other than an E segment are generated.

If it is determined in the step S922 that the processing has been completed with respect to all commands (YES to the step S922), the process proceeds to a step S923.

In the step S923, the sub CPU 301 generates the remainder of the segment having the current segment size S set to Sn, and the process proceeds to a step S924 wherein the sub CPU 301 increments the segment number B by one, followed by terminating the present process.

Figure 10:
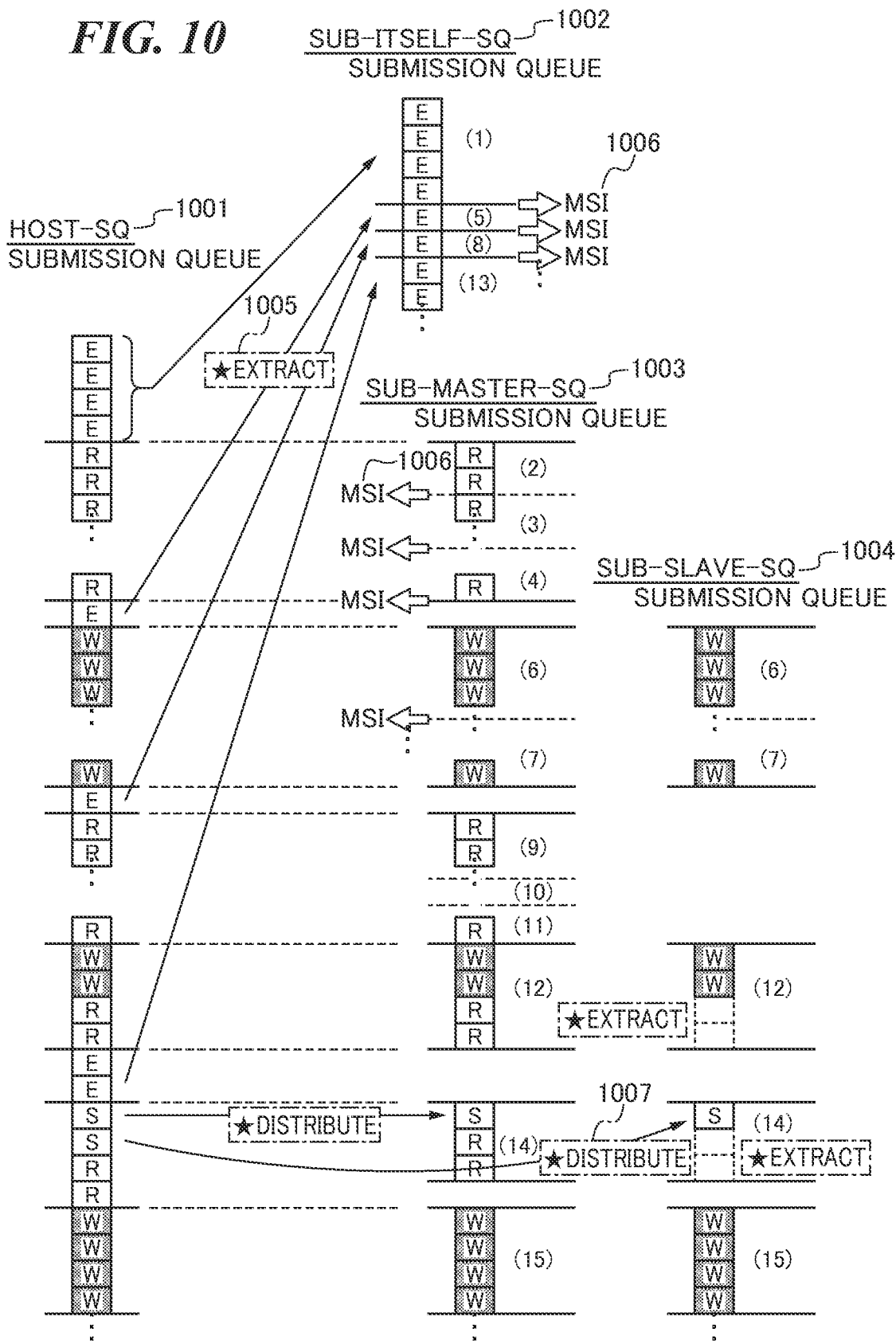
FIG. 10 is diagram useful in explaining the outline of a segment unit-based command processing method when the sub controller is normal.

FIG. 10 is diagram useful in explaining the outline of a segment unit-based command processing in a normal state.

A HOST-SQ 1001 is an original command sequence set in the SQ 501 in the HOST 101, and each rectangle appearing in FIG. 10 represents one command. The symbols E, W, R, and S added to the rectangles represent the above-mentioned command types (E command, W command, R command, and S command), respectively. In other words, the HOST 101 expects that the original command sequence in the SQ 501 is to be processed in the order of a sequence shown in FIG. 10 on a time-series basis without changing the order.

A SUB-itself-SQ 1002 is an SQ for the HOST 101 and the SUB 102 itself and is formed by an expanded command group extracted from the original command sequence. Although not shown in FIG. 5B, the SUB-itself-SQ 1002 is also a queue in a ring buffer formed in the RAM 306, for the SUB 102 to perform processing of NVMe commands (expanded commands) requested from the HOST 102. In the SUB-itself-SQ 1002, commands are sequentially stored based on the command contents (original command sequence) in the SQ 501 on a segment-by-segment basis.

A SUB-Master-SQ 1003 and a SUB-Slave-SQ 1004 each represent a command group (SQ) for one of the first storage device 103 and the second storage device 104. For example, in a case where the first storage device 103 is the master SSD, the SUB-Master-SQ 1003 is the SQ 511 of the SUB 102. Further, in a case where the second storage device 104 is the slave SSD, the SUB-Slave-SQ 1004 is the SQ 513 of the SUB 102. However, the master SSD and the slave SSD are not necessarily required to have a fixed relationship but may be replaced by each other according to a condition.

The HOST-SQ 1001 is divided into segments by the segment generation process described with reference to FIGS. 9A and 9B. As shown in FIG. 10, first, extraction 1005 of E segments is performed, and the other segments are sequentially set in the SUB-Master-SQ 1003 and the SUB-Slave-SQ 1004 as R segments, W segments, S segments, and M segments. With this, a command processing request is issued to each of the first storage device 103 and the second storage device 104 on a segment-by-segment basis. Accordingly, the command processing of each segment is executed. The numbers (1) to (15) indicated in FIG. 10 are segment numbers B referred to in the segment generation process described with reference to FIGS. 9A and 9B, and the segments are processed in the order of the segment numbers B. Therefore, each extracted E segment can be processed at a timing desired by the HOST 101. Then, when each segment processing is terminated, a termination notification interrupt is issued to the HOST 101 by an MSI 1006.

Here, a segment including R commands (such as a segment having a segment number (12)) set in the SUB-Master-SQ 1003 is set in the SUB-Slave-SQ 1004 as a segment from which the R commands have been extracted.

Further, in a case where a plurality of S commands are successively included in the same segment, distribution 1007 of the S commands to segments respectively set in the SUB-Master-SQ 1003 and the SUB-Slave-SQ 1004 (such as segments having a segment number (14)) is performed.

Next, the processing timing of the master SSD and the slave SSD will be described. As shown in FIG. 10, the slave SSD remains on standby and is not in operation so long as the master SSD is processing each R segment. For example, in FIG. 10, segments having segment numbers (2) to (4) and (9) to (11) are processed only by the master SSD, and during the time, the slave SSD is on standby, which is indicated by an empty space (blank). On the other hand, segments including W commands or S commands, such as segments having segment numbers (6), (7), (12), (14), and (15), are simultaneously processed by both of the master SSD and the slave SSD.

As described above, the original command sequence is divided into segments, and is processed while performing extraction and distribution of commands.

A situation in which an error has occurred during the segment processing described with reference to FIG. 10 and a process for recovering the error (error handling) is executed will be described with reference to FIG. 11.

Figure 11:
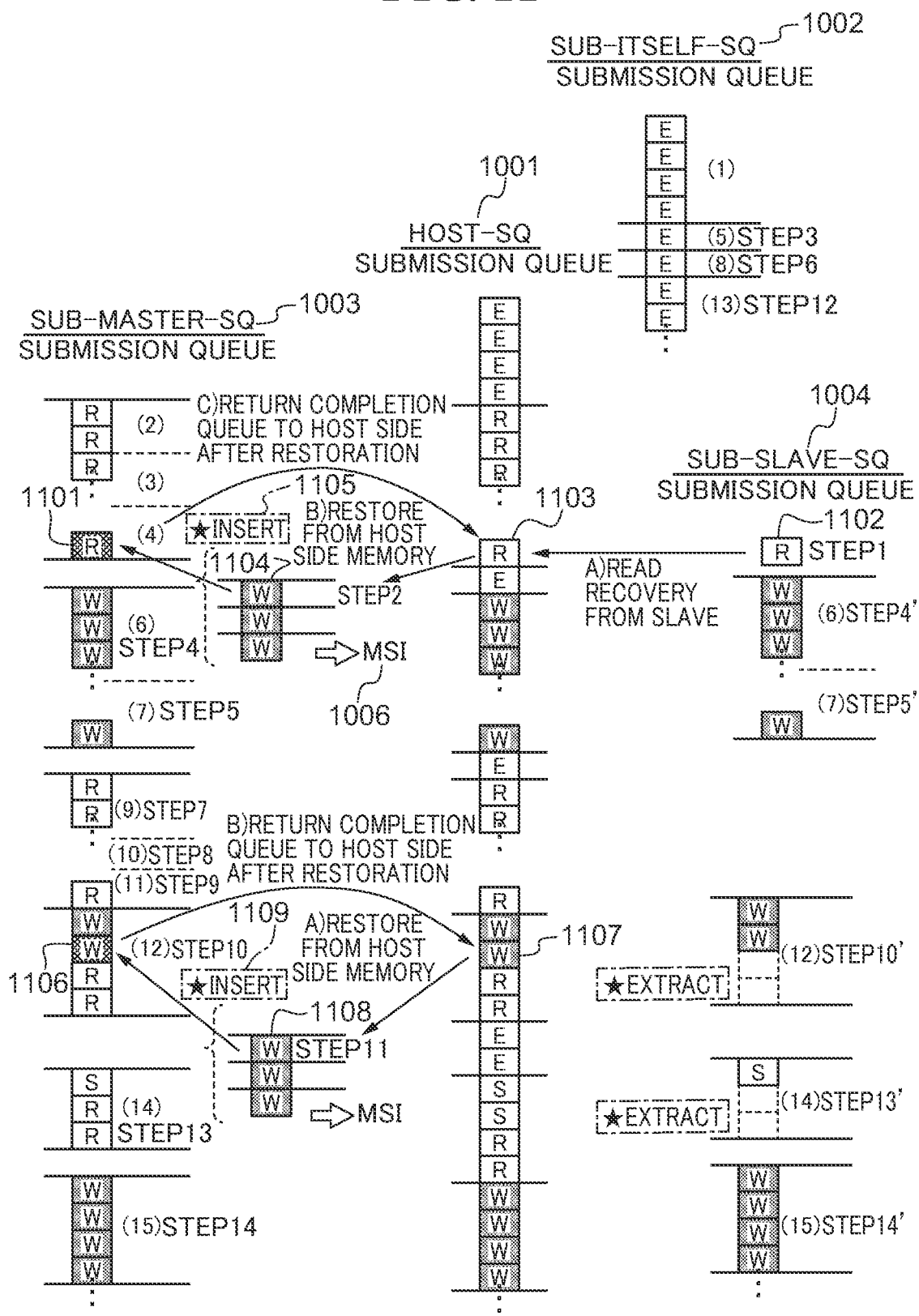
FIG. 11 is a diagram showing an example of a segment unit-based error handling method used when two errors have occurred.

FIG. 11 is a diagram showing an example of a segment unit-based error handling method used when two errors have occurred.

In the illustrated example in FIG. 11, a first error has occurred in an R command 1101 included in an R segment having a segment number (4), and a second error has occurred in a W command 1106 included in an M segment having the segment number (12). Further, the segment numbers (1) to (15) indicate the same segment numbers as those in FIG. 10, but a step 1 to a step 14 represent the order of actual segment processing.

A case will be described where at the time of termination of the segment processing of the R segment having the segment number (4) in the SUB-Master-SQ 1003, the SUB 102 detects an error of the R command 1101 included in the current segment (R segment). In this case, the SUB 102 generates an R segment for the slave SSD, which is formed by an R command 1102 having the same address. After that, the SUB 102 sets the R segment for the slave SSD in the SUB-Slave-SQ 1004 (SQ 513) and executes the R command 1102 (step 1). With this, the read data is written into a specified memory area in the HOST 101. At this time point, the status (CQ 502) indicating that the processing of the R segment having the segment number (4) has been terminated is not returned to the HOST 101 yet. After that, the SUB 102 generates an error W segment formed by a W command 1104 for executing the R command 1103 in place of the R command 1101 which caused the error, thereby writing the read data stored in the memory of the HOST 101 into an area associated with the R command 1101. Then, the SUB 102 (segment insertion unit) executes data restoration of the R command 1101 which has failed, by setting the error W segment in the SUB-Master-SQ 1003 in place of the R command 1101 of the R segment having the segment number (4) and executing the W command 1104 (step 2). Note that the step 2 appearing in FIG. 11 shows an example of retrying restoration of the data of the R command 1101 up to three times (generating the error W segment three times at maximum). The number of times of retry processing can be set in advance by the SETUP_SUBCON 801. Then, after the retry processing, the SUB 102 issues a processing termination interrupt by the MSI 1006 to return a status (CQ) indicating that the processing of the R segment having the segment number (4) has been terminated.

Next, a case will be described where at the termination of the segment processing of the segment having the segment number (12) (steps 10 and 10'), the SUB 102 detects an error of the W command 1106 included in the current segment (M segment). In this case, even when the processing of the W command 1106 (step 10') is successful in the slave SSD, a status indicating that the processing of the M segment having the segment number (12) has been terminated is not returned to the HOST 101 yet. After that, the SUB 102 generates an error W segment formed by a W command 1108 having the same contents as those of the W command 1106. Then, the SUB 102 executes data restoration of the W command 1106 which has failed, by setting the error W segment in the SUB-Master-SQ 1003 in place of the W command 1106 of the M segment having the segment number (12) and executing the W command 1108 again (step 11). Note that the step 11 also shows, similarly to the step 2, an example of retrying restoration of the data of the W command 1106 up to three times (generating the error W segment three times at maximum). After the retry processing is terminated, the SUB 102 issues a processing termination interrupt by the MSI 1006 to return the status (CQ) indicating that the processing of the M segment having the segment number (12) has been terminated.

Needless to say, the contents of the interrupt notifications issued by the MSI 1006 at the termination of the segment processing operations for the segments having the segment numbers (4) and (12) in which the errors have occurred are different according to results of the above-described error recovery processing (retry processing). For example, if the error recovery processing is successful, MSI (OK) is notified by an interrupt, whereas if the error recovery processing fails, MSI (ERR) is notified by an interrupt.

Figure 12A:
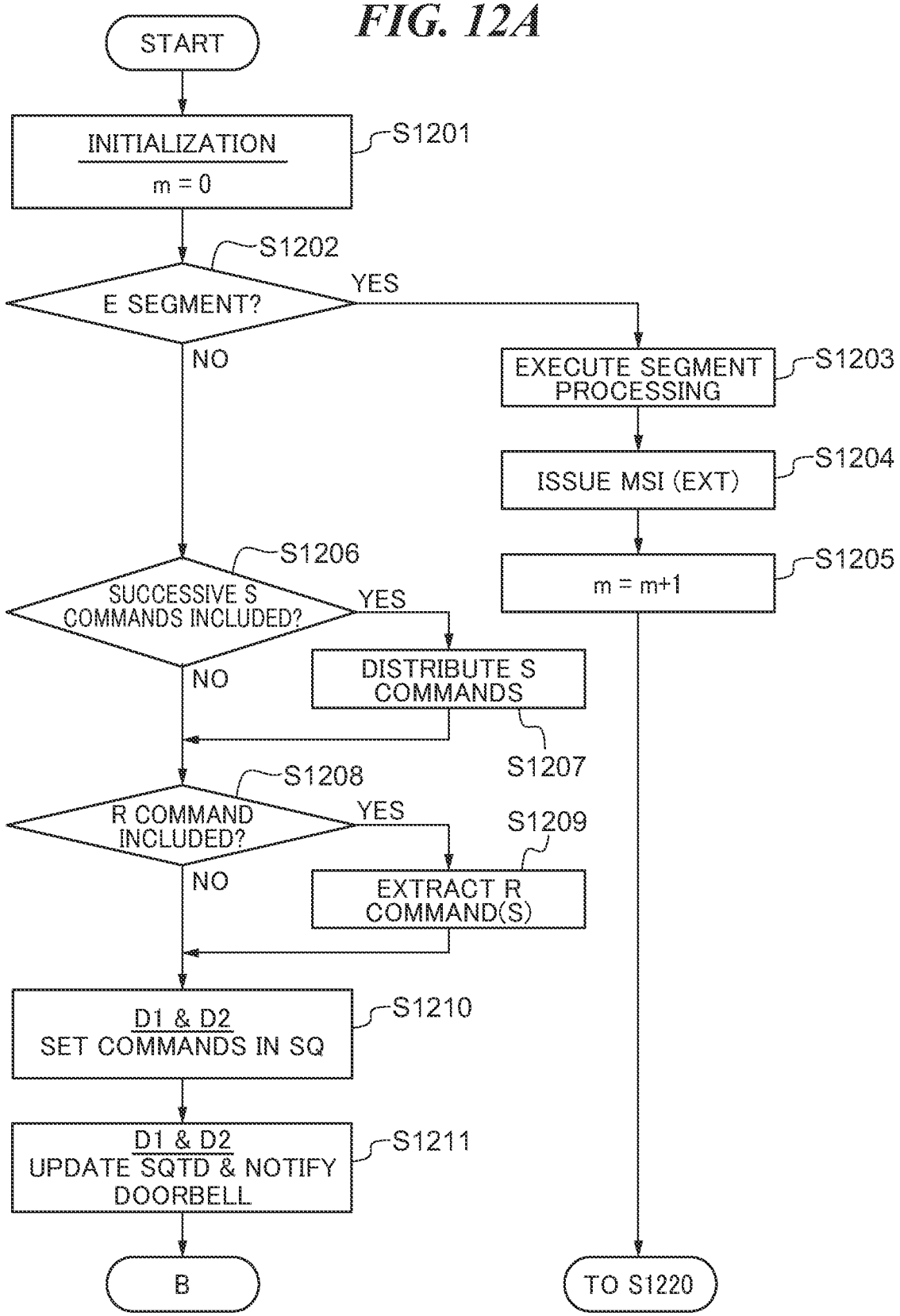
FIG. 12A is a flowchart of a segment process performed by the sub controller.
Figure 12B:
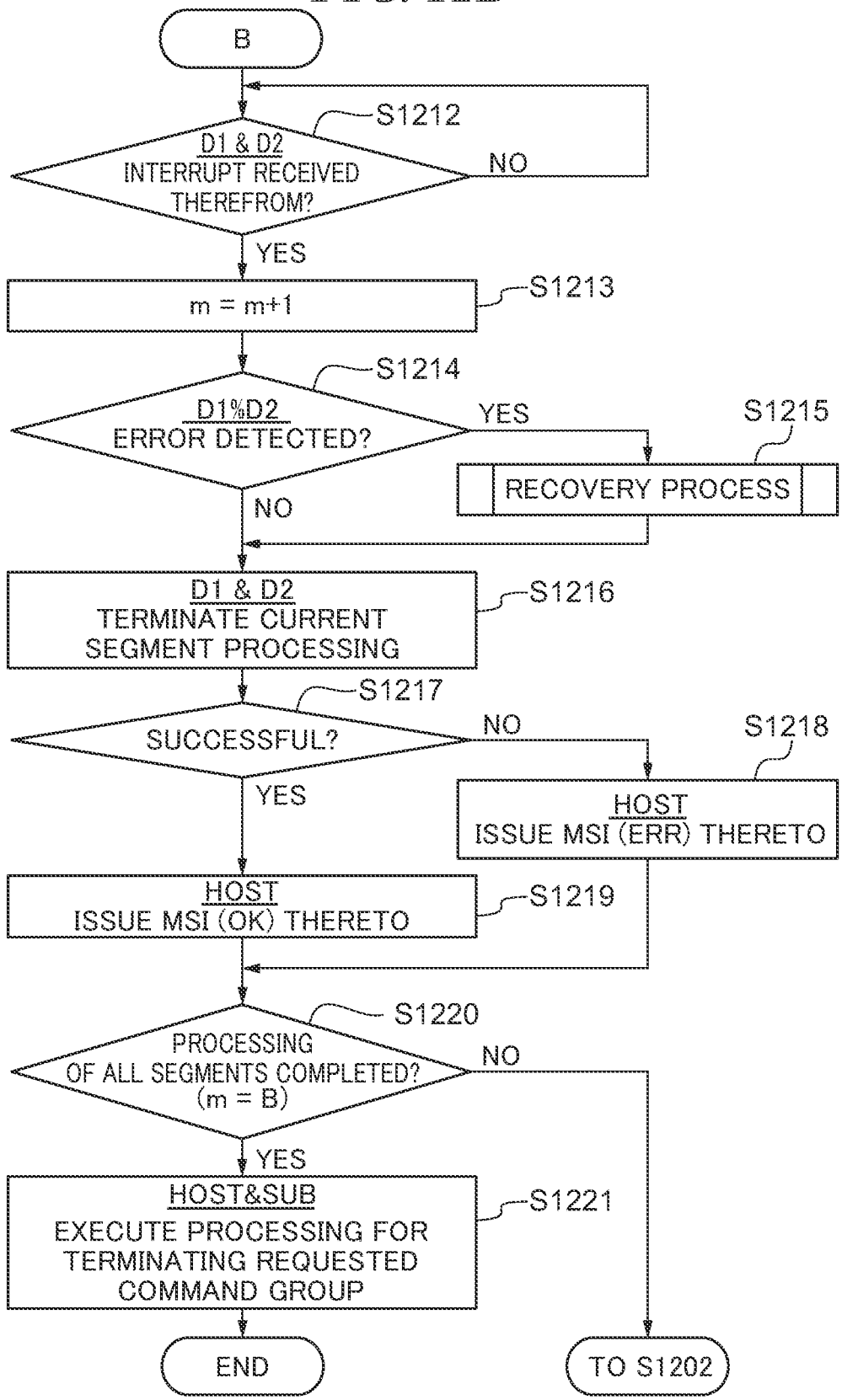
FIG. 12B is a continuation of FIG. 12A

The whole of segment processing operations (segment process) executed by the SUB 102, described with reference to FIGS. 9A, 9B, 10, and 11, will be described with reference to FIGS. 12A and 12B.

In a step S1201, the sub CPU 301 performs initialization. More specifically, the sub CPU 301 initializes a segment processing number m which is a variable for recording a segment number corresponding to the number of segments which has been processed to 0.

In a step S1202, the sub CPU 301 determines whether or not the current segment is an E segment. If it is determined that the current segment is an E segment (YES to the step S1202), the process proceeds to a step S1203.

In the step S1203, the sub CPU 301 executes the current segment processing, returns a status to the CQ 502 of the HOST 101 in a step S1204, and notifies the HOST 101 of termination of the segment processing by issuing an MSI (EXT) for the E segment. Then, the process proceeds to a step S1205.

In the step S1205, the sub CPU 301 increments the segment processing number m by one, and then the process proceeds to a step S1220.

If it is determined in the step S1202 that the current segment is not an E segment, the process proceeds to a step S1206.

In the step S1206, the sub CPU 301 determines whether or not S commands are successively included in the current segment. If it is determined that S commands are successively included in the current segment (YES to the step S1206), the process proceeds to a step S1207.

In the step S1207, the sub CPU 301 (segment distribution unit) generates segments by distributing the S commands to a segment for the master SSD and a segment for the slave SSD, one to each, and then the process proceeds to a step S1208.

If it is determined in the step S1206 that no S command is included in the current segment, or even when an S command is included, S commands are not successively included (NO to the step S1206), the process proceeds to the step S1208.

In the step S1208, the sub CPU 301 determines whether or not an R command or R commands is/are included in the current segment. If it is determined that an R command or R commands is/are included in the current segment (YES to the step S1208), the process proceeds to a step S1209.

In the step S1209, the sub CPU 301 generates a segment by extracting the R command or the R commands from the current segment as the segment for the slave SSD, and then the process proceeds to a step S1210.

If it is determined in the step S1208 that no R command is included in the current segment (NO to the step S1208), the process proceeds to the step S1210.

In the step S1210, the sub CPU 301 (setting unit) independently sets the commands of the current segment to each of the SQ 511 for the master SSD and the SQ 513 for the slave SSD. In this description, the master SSD is hereinafter referred to as the "D1" in a simplified form, and the slave SSD is referred to as the "D2" in a simplified form.

In a step S1211, the sub CPU 301 (processing request-issuing unit) issues a command processing request to both of the D1 and the D2 on a segment-by-segment basis. More specifically, the sub CPU 301 updates each SQTD to execute the doorbell notification as described above. Next, the process proceeds to a step S1212 in FIG. 12B.

In the step S1212, the sub CPU 301 (termination interrupt reception unit) determines whether or not the processing of the current segment has been terminated. More specifically, when a segment processing termination interrupt is received from both of the D1 and the D2, it is determined that the processing of the current segment has been terminated. If it is determined that the processing of the current segment has not been terminated (NO to the step S1212), the process remains in the step S1212, whereas if it is determined that the processing of the current segment has been terminated (YES to the step S1212), the process proceeds to a step S1213.

In the step S1213, the sub CPU 301 increments the segment processing number m by one, and then the process proceeds to a step S1214.

In the step S1214, the sub CPU 301 checks the status (CQs 512 and 514) of the segment processing results of the D1 and the D2 and determines whether or not an error has been detected from one of the D1 and the D2. If it is determined that an error has been detected from one of the D1 and the D2 (YES to the step S1214), the process proceeds to a step S1215.

In the step S1215, the sub CPU 301 executes a recovery process. The recovery process will be described hereinafter with reference to FIGS. 13A and 13B. After completion of the recovery process, the process proceeds to a step S1216.

If it is determined in the step S1214 that no error has been detected from either the D1 of the D2 (NO to the step S1214), the process proceeds to the step S1216.

In the step S1216, the sub CPU 301 terminates the current segment processing for the D1 and the D2. The method of terminating the current segment processing has already been described in the steps S603 and S604, and hence the description thereof is omitted.

In a step S1217, the sub CPU 301 determines whether or not the current segment processing including the recovery process is successful for the D1 and the D2. If it is determined that the recovery process has failed and the current segment processing has finally failed (NO to the step S1217), the process proceeds to a step S1218.

In the step S1218, the sub CPU 301 (progress notification unit) issues an interrupt notification of MSI (ERR) indicating that an error has occurred during the progress of the command processing to the HOST 101, and then the process proceeds to the step S1220.

If it is determined in the step S1217 that the current segment processing is finally successful (YES to the step S1217), the process proceeds to a step S1219 to issue an interrupt notification of MSI (OK) indicating that the command processing is successful to the HOST 101, and then proceeds to the step S1220.

In the step S1220, the sub CPU 301 determines whether or not the processing has been completed for all segments. Here, completion of the processing for all segments means matching between the segment number B referred to in the segment generation process described with reference to FIGS. 9A and 9B and the segment processing number m in this process. If it is determined that the processing has not been completed for all segments yet (NO to the step S1220), the sub CPU 301 returns to the step S1202, whereas if it is determined that the processing has been completed with respect to all segments (YES to the step S1220), the process proceeds to a step S1221.

In the step S1221, the sub CPU 301 (termination interrupt-issuing unit and completion reception unit) executes termination processing for the command group requested from the HOST 101, followed by terminating the present process. The termination processing for the command group has already been described in the step S606, and hence description thereof is omitted. Note that although not shown, the steps S1210 to S1212 are executed only for the D1 when the single mode (configuration in which the slave SSD is not connected to the SUB 102) is set.

According to the segment process described with reference to FIGS. 12A and 12B, it is possible to perform the processing for all segments generated in FIGS. 9A and 9B including the recovery process without putting the time series of the original command sequence into disorder.

Figure 13A:
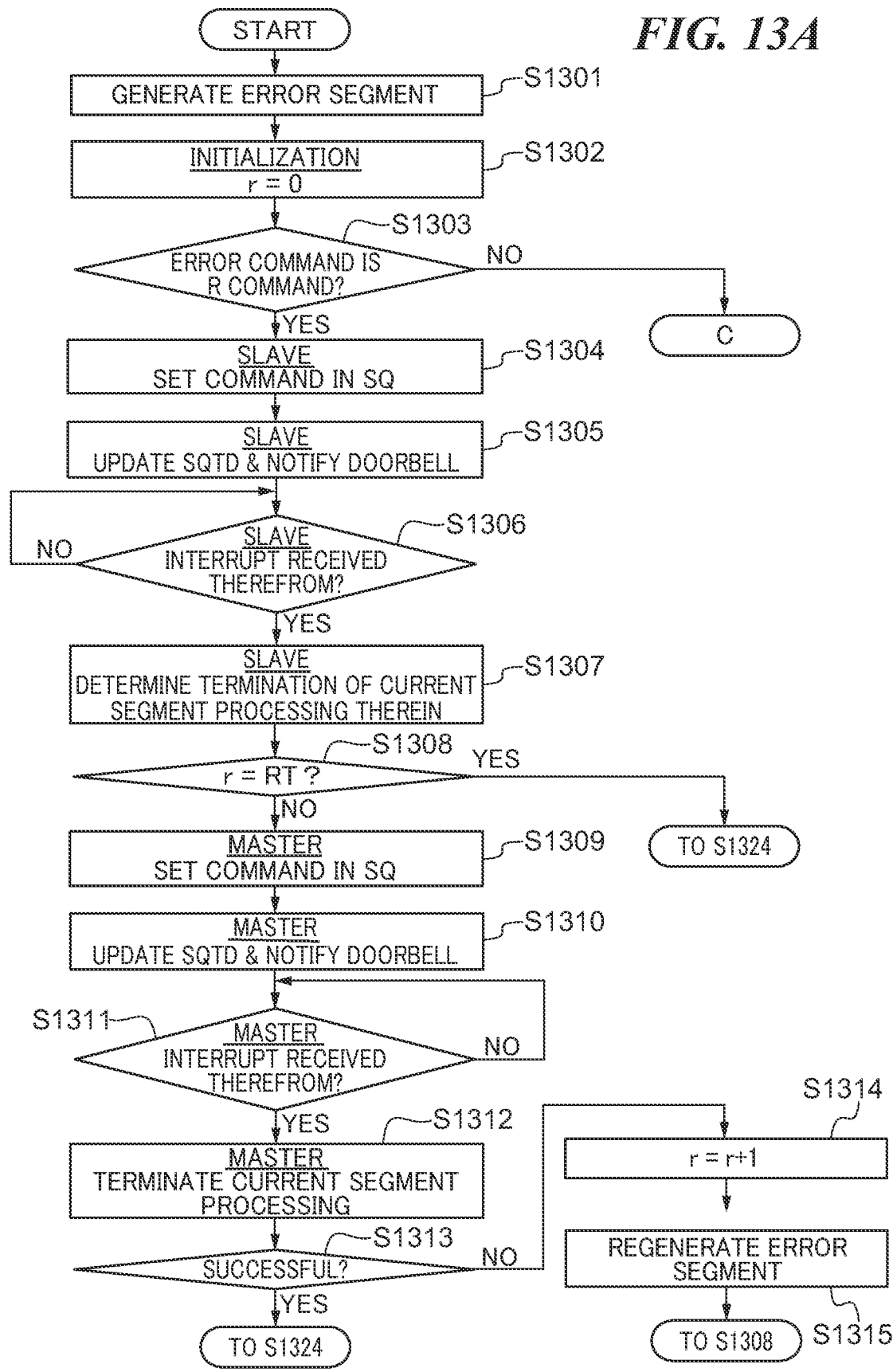
FIG. 13A is a flowchart of a recovery process executed in a step in the segment process.
Figure 13B:
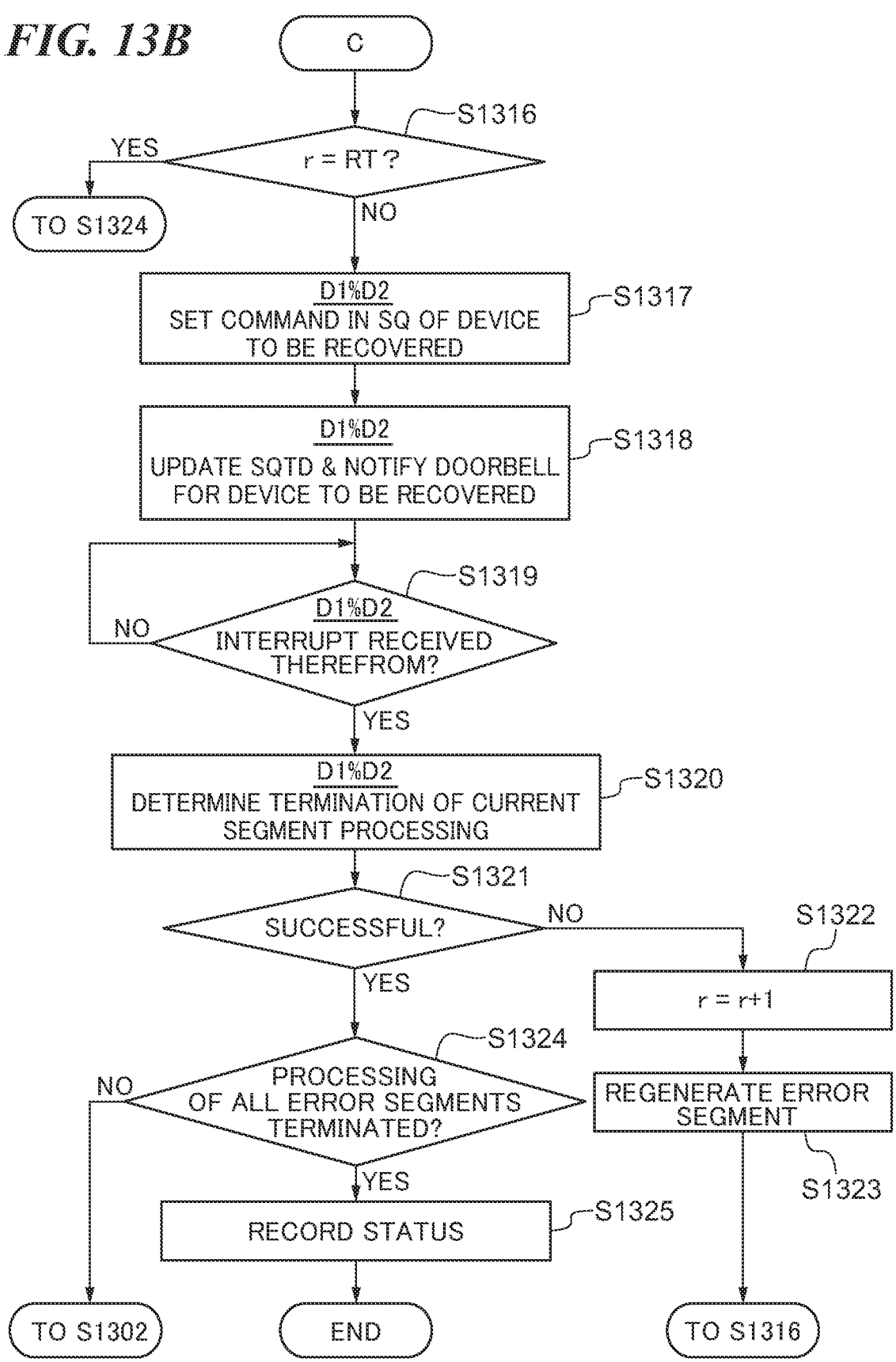
FIG. 13B is a continuation of FIG. 13A

The recovery process in the step S1215 in FIG. 12B will be described with reference to FIGS. 13A and 13B. Note that in the present embodiment, it is assumed that in the master SSD and the slave SSD, errors do not occur simultaneously in the same addresses, and further, an error does not occur with respect to the S command.

In a step S1301, the sub CPU 301 (generation unit) generates an error segment corresponding to a command included in the current segment in which an error has occurred. Here, cases where a plurality of error commands occur in the current segment include, for example, a case where the M segment having the segment number (12) is the current segment and all of the four commands (hereinafter referred to as the W commands W1 and W2 and the R commands R1 and R2) included in the current segment cause errors. In this case, there are generated a plurality of error segments which are separated according to command types, i.e. in this example separated into an error W segment including W commands W1' and W2' for restoring data of the W commands W1 and W2, and an error W segment including W commands W1" and W2" for restoring data of the R commands R1 and R2.

In a step S1302, the sub CPU 301 performs initialization. More specifically, the sub CPU 301 initializes a retry number r as a variable for recording the number of times of retrying data restoration using an error segment to 0.

In a step S1303, the sub CPU 301 determines whether or not an error command is an R command. If it is determined that an error command is an R command (YES to the step S1303), the process proceeds to a step S1304, whereas if it is determined that an error command is not an R command (i.e. an error command is a W command) (NO to the step S1303), the process proceeds to a step S1316 (in FIG. 13B).

In the step S1304, the sub CPU 301 generates an R segment for the slave SSD, which is formed by an R command in the same address as the error command included in the current segment. Next, the sub CPU 301 sets the R segment for the slave SSD in the SQ 513 of the slave SSD (similar to the above description, the second storage device 104 is assumed to be the slave SSD).

In a step S1305, the sub CPU 301 performs processing for starting execution of the command. More specifically, the sub CPU 301 updates the SQTD 411 of the second storage device 104 as the target device to execute doorbell notification. Note that the steps S1304 and S1305 are executed by the slave SSD, because since R commands are processed only by the master SSD as described above, recovery in a case where an R command has caused an error is executed by the slave SSD.

In a step S1306, the sub CPU 301 determines whether or not a segment processing termination interrupt has been received from the slave SSD. If it is determined that no segment processing termination interrupt has been received from the slave SSD yet (NO to the step S1306), the process remains in the step S1306. On the other hand, if it is determined that a segment processing termination interrupt has been received from the slave SSD (YES to the step S1306), the process proceeds to a step S1307.

In the step S1307, the sub CPU 301 judges that the current segment processing in the slave SSD has been terminated, and then the process proceeds to a step S1308.

In the step S1308, the sub CPU 301 determines whether or not the retry number r is equal to the maximum retry number RT. Note that the maximum retry number RT has been set in advance by the above-described expanded command. If it is determined that the retry number r is smaller than the maximum retry number RT (NO to the step S1308), the process proceeds to a step S1309, whereas if it is determined that the retry number r is equal to the maximum retry number RT (YES to the step S1308), the process proceeds to a step S1324 in FIG. 13B.

In the step S1309, the sub CPU 301 sets the error W segment in the SQ 511 of the master SSD (similar to the above description, the first storage device 103 is assumed to be the master SSD) as the recovery target, and then the process proceeds to a step S1310.

In the step S1310, the sub CPU 301 performs processing for starting execution of the command. More specifically, the sub CPU 301 updates the SQTD 405 of the first storage device 103 as the target device to execute doorbell notification.

In a step S1311, the sub CPU 301 determines whether or not a segment termination interrupt has been received from the master SSD. If it is determined that no segment termination interrupt has been received from the master SSD yet (NO to the step S1311), the process remains in the step S1311. On the other hand, if it is determined that a segment termination interrupt has been received from the master SSD (YES to the step S1311), the process proceeds to a step S1312.

In the step S1312, the sub CPU 301 judges that the current segment processing on the master SSD side has been terminated, and then the process proceeds to a step S1313.

In the step S1313, the sub CPU 301 determines whether or not data recovery for all the R commands having failed is successfully performed by the processing of the error W segment which is the current segment. If it is determined that data recovery for at least one of the R commands having failed is not successful (NO to the step S1313), the process proceeds to a step S1314. On the other hand, if it is determined that data recovery for the R commands having failed is all successful (YES to the step S1313), the process proceeds to the step S1324.

In the step S1314, the sub CPU 301 increments the retry number r by one, and then the process proceeds to a step S1315.

In the step S1315, the sub CPU 301 generates the error W segment again. Here, for example, there is a case where the data of the R command R2 has been successfully recovered earlier by the processing of the error W segment including the W commands W1" and W2", described by way of example in the step S1301, but the data of the R command R1 has not been successfully recovered yet. In this case, the error W segment regenerated for the second retry is formed only by the W command W1".

After execution of the step S1315, the sub CPU 30 returns to the step S1308 again, and repeats the steps S1309 to S1315 until the number of times of retry processing reaches the maximum retry number RT.

In the step S1316 (in FIG. 13B), the sub CPU 301 determines whether or not the retry number r is equal to the maximum retry number RT. If it is determined that the retry number r is smaller than the maximum retry number RT (NO to the step S1316), the process proceeds to a step S1317, whereas if it is determined that the retry number r is equal to the maximum retry number RT (YES to the step S1316), the process proceeds to the step S1324.

In the step S1317, the sub CPU 301 sets the error W segment in the SQ of a device as the recovery target out of the master SSD and the slave SSD, and then the process proceeds to a step S1318. Similar to the above, the master SSD is referred to as the "D1" in a simplified form, and the slave SSD is referred to as the "D2" in a simplified form.

In the step S1318, the sub CPU 301 performs processing for starting execution of the command. More specifically, the sub CPU 301 updates the SQTD for the device as the recovery target to execute doorbell notification.

In a step S1319, the sub CPU 301 determines whether or not segment processing termination interrupts have been received from the D1 and the D2. If it is determined that segment processing termination interrupts have not been received from the D1 and the D2 yet (NO to the step S1319), the process remains in the step S1319, whereas if it is determined that segment processing termination interrupts have been received from the D1 and the D2 (YES to the step S1319), the process proceeds to a step S1320.

In the step S1320, the sub CPU 301 judges that the current segment processing of both of the D1 and D2 has been terminated, and then the process proceeds to a step S1321.

In the step S1321, the sub CPU 301 determines whether or not data recovery for all the W commands having failed is successfully performed by the processing of the error W segment which is the current segment. If it is determined that data recovery for at least one of the W commands having failed is not successful (NO to the step S1321), the process proceeds to a step S1322. On the other hand, if it is determined that data recovery for the W commands having failed is successful (YES to the step S1321), the process proceeds to the step S1324.

In the step S1322, the sub CPU 301 increments the retry number r by one, and then the process proceeds to a step S1323.

In the step S1323, the sub CPU 30 generates the error W segment again. Regeneration of the error W segment in this step is performed similar to the step S1315, and hence detailed description is omitted.

After execution of the step S1323, the sub CPU 30 returns to the step S1316 again, and repeats the steps S1317 to S1323 until the number of times of retry processing reaches the maximum retry number RT.

In the step S1324, the sub CPU 301 determines whether or not processing of all the error W segments has been terminated. If it is determined that processing of at least one of the error W segments has not been terminated (NO to the step S1324), the sub CPU 301 returns to the step S1302, and performs the processing of the remaining error W segments. For example, for the processing of the error W segment including the W commands W1' and W2', described by way of example in the step S1301, it is required to perform the execution processing of the W commands W1' and W2' at least twice. On the other hand, if it is determined that processing of all the error W segments has been terminated (YES to the step S1324), the process proceeds to a step S1325.

In the step S1325, the sub CPU 301 records recovery results, followed by terminating the present process. The recovery results recorded in this step are used for the determination in the step S1217 in FIG. 12B and reflected on the contents of the MSI 1006 issued to the HOST 101.

Although not described in detail here, in a case where the single mode (configuration in which the slave SSD is not connected to the SUB 102) is set, there is no partner used for data recovery differently from the mirroring mode of the present embodiment. Therefore, when the single mode is set, the determination in the step S1303 is not performed, but in the recovery process of all error commands including R commands, the D1 itself executes the steps S1316 to S1323.

As described with reference to FIGS. 9A, 9B, 10, 11, 12A, 12B, 13A, and 13B, the original command sequence prepared in the HOST 101 is divided into segments by the SUB 102. Further, the command processing operations are executed while performing extraction and distribution of desired NVMe commands, and generation and insertion of new error segments. Further, although in the present embodiment, the description is given of the mirroring mode using the two SSDs by way of example, the disclosure can be applied to the the single mode and a configuration including three or more SSDs.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-064233, filed Apr. 5, 2021, which is hereby incorporated by reference herein in its entirety.

What is claimed is:

1. An information processing apparatus that functions as a SUB controller configured to, for a command group formed of pairs each formed by a command prepared by a host controller and a status, execute command processing of each command and return a status of an execution result of the command processing, comprising:
   at least one processor; and
   a memory coupled to the at least one processor, the memory having instructions that, when executed by the processor, perform the operations as:
   an acquisition unit configured to acquire, in response to receipt of a request for processing the command group from the host controller, the command group from the host controller as an original command sequence;
   a segmentation unit configured to divide the original command sequence into a plurality of segments each formed by one or more commands and having a total volume not larger than a threshold value;
   a setting unit configured to independently set respective command groups each formed of pairs each formed by a command and a status, in one or more storage devices connected to the information processing apparatus; and
   a notification unit configured to notify each of the one or more storage devices of a command processing request on a segment-by-segment basis.

2. The information processing apparatus according to claim 1, wherein the at least one processor is configured to further perform the operations as a timing control unit configured to control the timing of returning each of statuses to the host controller according to the contents of the statuses received from the one or more storage devices, respectively.

3. The information processing apparatus according to claim 1, wherein the at least one processor is configured to further perform the operations as:
   a termination interrupt reception unit configured to receive command processing termination interrupts from the one or more storage devices on a segment-by-segment basis, respectively, and
   a completion notification unit configured to notify each of the one or more storage devices of completion of command processing on a segment-by-segment basis.

4. The information processing apparatus according to claim 1, wherein the at least one processor is configured to further perform the operations as a progress notification unit configured to notify the host controller of a progress of command processing in units of one or more segments.

5. The information processing apparatus according to claim 1, wherein the at least one processor is configured to further perform the operations as:
   a termination interrupt-issuing unit configured to issue a command processing termination interrupt to the host controller, and
   a completion reception unit configured to receive command processing completion from the host controller.

6. The information processing apparatus according to claim 1, wherein the at least one processor is configured to further perform the operations as:
   a generation unit configured to newly generate a segment including a command for restoring a command having caused an error in one of the one or more storage devices during the segment-based command processing, and a segment insertion unit configured to insert the newly generated segment in place of the command having caused an error.

7. The information processing apparatus according to claim 1, wherein the at least one processor is configured to further perform the operations as an access unit configured to enable the information processing apparatus and the one or more storage devices to perform writing or reading with respect to a target in a memory space of the host controller.

8. The information processing apparatus according to claim 1, wherein expanded commands for acquiring settings and an internal status of the information processing apparatus are defined between the host controller and the information processing apparatus.

9. The information processing apparatus according to claim 1, wherein a segment formed by one or more of the expanded commands is generated by extracting the one or more of the expanded commands from the original command sequence.

10. The information processing apparatus according to claim 1, wherein the setting unit has a holding unit configured to hold position information of the set command group with respect to the original command sequence.

11. The information processing apparatus according to claim 1, wherein the at least one processor is configured to further perform the operations as a segment distribution unit configured to distribute, in a case where a plurality of system commands for the one or more storage devices are included in the same segment, the plurality of system commands to the one or more storage devices, respectively.

12. The information processing apparatus according to claim 1, wherein the one or more storage devices are a storage device on a master side, and a storage device on a slave side that duplicates and stores data stored in the storage device on the master side, wherein the at least one processor is configured to further perform the operations as a separation unit configured to, in a case where read commands and write commands are mixed in the original command sequence, divide the original command sequence into segments such that no write command immediately follows a read command in a segment including the read command.

13. The information processing apparatus according to claim 12, wherein in a case where a read command is included in a segment to be set in the storage device on the master side, the setting unit extracts the read command from a segment to be set in the storage device on the slave side.

14. The information processing apparatus according to claim 13, wherein in a case where processing of the read command has caused an error in the storage device on the master side, the setting unit sets a read command having the same address as the read command having caused the error, in the storage device on the slave side.

15. The information processing apparatus according to claim 1, wherein the at least one processor is configured to further perform the operations as a segment condition-setting unit configured to set the threshold value in advance.

16. A method of controlling an information processing apparatus that functions as a SUB controller configured to, for a command group formed of pairs each formed by a command prepared by a host controller and a status, execute command processing of each command and return a status of an execution result of the command processing, comprising:

acquiring, in response to receipt of a request for processing the command group from the host controller, the command group from the host controller as an original command sequence;

dividing the original command sequence into a plurality of segments each formed by one or more commands and having a total volume not larger than a threshold value;

independently setting respective command groups each formed of pairs each formed by a command and a status, in one or more storage devices connected to the information processing apparatus; and notifying each of the one or more storage devices of a command processing request on a segment-by-segment basis.

17. A non-transitory computer-readable storage medium storing a program for causing a computer to execute a method of controlling an information processing apparatus that functions as a SUB controller configured to, for a command group formed of pairs each formed by a command prepared by a host controller and a status, execute command processing of each command and return a status of an execution result of the command processing, wherein the method comprises:

acquiring, in response to receipt of a request for processing the command group from the host controller, the command group from the host controller as an original command sequence;

dividing the original command sequence into a plurality of segments each formed by one or more commands and having a total volume not larger than a threshold value;

independently setting respective command groups each formed of pairs each formed by a command and a status, in one or more storage devices connected to the information processing apparatus; and notifying each of the one or more storage devices of a command processing request on a segment-by-segment basis.

* * * * *